United States Patent
Tsukamoto et al.

(10) Patent No.: US 10,530,198 B2
(45) Date of Patent: Jan. 7, 2020

(54) R-T-B BASED SINTERED MAGNET AND MOTOR

(71) Applicant: TDK CORPORATION, Tokyo (JP)

(72) Inventors: Naoto Tsukamoto, Tokyo (JP); Hiroshi Miyasaka, Tokyo (JP); Makoto Iwasaki, Tokyo (JP); Takahiro Kawashima, Tokyo (JP); Chikara Ishizaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 527 days.

(21) Appl. No.: 15/258,589

(22) Filed: Sep. 7, 2016

(65) Prior Publication Data

US 2017/0076846 A1   Mar. 16, 2017

(30) Foreign Application Priority Data

Sep. 11, 2015  (JP) ................................. 2015-180031

(51) Int. Cl.
*H02K 1/02*       (2006.01)
(52) U.S. Cl.
CPC ..................................... *H02K 1/02* (2013.01)
(58) Field of Classification Search
CPC ..................................... H02K 1/02; H01F 7/02
See application file for complete search history.

(56) References Cited

U.S. PATENT DOCUMENTS

| | | | |
|---|---|---|---|
| 6,657,326 B1 * | 12/2003 | Yamamoto | H02K 33/16 310/12.24 |
| 2008/0245442 A1 | 10/2008 | Nakamura et al. | |
| 2009/0322459 A1 * | 12/2009 | Nagata | C23C 14/18 335/302 |
| 2011/0080065 A1 | 4/2011 | Watanabe et al. | |
| 2014/0118098 A1 | 5/2014 | Sagawa et al. | |
| 2015/0086710 A1 | 3/2015 | Takagi | |

FOREIGN PATENT DOCUMENTS

| | | |
|---|---|---|
| CN | 103503087 A | 1/2014 |
| JP | 2011-078269 A | 4/2011 |
| JP | 2015-065218 A | 4/2015 |
| WO | 2006/043348 A1 | 4/2006 |

* cited by examiner

*Primary Examiner* — Jessee R Roe
(74) *Attorney, Agent, or Firm* — Oliff PLC

(57) ABSTRACT

An R-T-B based sintered magnet includes a first main surface and a first side surface. The first main surface has a coercivity that is higher than that of the first side surface. $\Delta Hcj_M \leq 60$ kA/m is satisfied, where $\Delta Hcj_M$ is a difference in coercivity between a portion having a highest coercivity on the first main surface and a portion having a lowest coercivity on the first main surface. $\Delta Hcj_G \leq 60$ kA/m is satisfied, where $\Delta Hcj_G$ is a difference in coercivity between a portion having a highest coercivity on a first cross section and a portion having a lowest coercivity on the first cross section and the first cross section is a cross section parallel to the first main surface and spaced from the first main surface at a predetermined length or more.

15 Claims, 16 Drawing Sheets

R-T-B BASED SINTERED MAGNET AND MOTOR

BACKGROUND OF THE INVENTION

1. Field of the Invention

The present invention relates to an R-T-B based sintered magnet and a motor.

2. Description of the Related Art

Since R-T-B based sintered magnets allow high magnetic characteristics, they have been used in a wide range of fields, and their fields of use have been increasingly expanding in recent years. Although magnetic characteristics of R-T-B based sintered magnets have been dramatically improving along with such expansion of their fields of use, further improvement is expected in magnetic characteristics of R-T-B based sintered magnets.

For example, Patent Document 1 describes a sintered rare earth magnet where a magnet body is immersed in a slurry in which various kinds of fine powder containing rare earth elements are dispersed in water or an organic solvent, after which the magnet body is heated to perform grain boundary diffusion, whereby residual magnetic flux density and coercivity are improved.

Patent Document 1: WO 06/43348 A

SUMMARY OF THE INVENTION

The present invention has an object of providing an R-T-B based sintered magnet having a usage amount of a heavy rare earth element reduced more than that of a conventional R-T-B based sintered magnet and excelling in magnetic characteristics and providing a motor employing the R-T-B based sintered magnet.

In order to achieve the above-mentioned object, an R-T-B based sintered magnet of the present invention includes a first main surface and a first side surface, wherein the first main surface has a coercivity that is higher than that of the first side surface, $\Delta Hcj_M \leq 60$ kA/m is satisfied, where $\Delta Hcj_M$ is a difference in coercivity between a portion having a highest coercivity on the first main surface and a portion having a lowest coercivity on the first main surface, and $\Delta Hcj_G \leq 60$ kA/m is satisfied, where $\Delta Hcj_G$ is a difference in coercivity between a portion having a highest coercivity on a first cross section and a portion having a lowest coercivity on the first cross section and the first cross section is a cross section parallel to the first main surface and spaced from the first main surface at a predetermined length or more.

$\Delta Hcj_M$ represents unevenness in coercivity in the first main surface. $\Delta Hcj_G$ represents unevenness in coercivity in a horizontal cross section that is spaced from the first main surface at a predetermined length or more and is parallel to the first main surface. In an R-T-B based sintered magnet whose $\Delta Hcj_M$ and $\Delta Hcj_G$ are small, a usage amount of a heavy rare earth element is reduced more than in a conventional R-T-B based sintered magnet, and magnetic characteristics are excellent.

In another mode of the present invention, it is preferable that 5 kA/m $\leq \Delta Hcj_C \leq 80$ kA/m is satisfied, where $\Delta Hcj_C$ is a difference in coercivity between a portion having a highest coercivity and a portion having a lowest coercivity on a straight line that passes through a central part of the first main surface and is perpendicular to the first main surface. $\Delta Hcj_C$ indicates unevenness in coercivity on a perpendicular line drawn perpendicularly to the first main surface from a central part of the first main surface.

In another mode of the present invention, it is preferable that $|\Delta Hcj_C - \Delta Hcj_E| \leq 20$ kA/m is satisfied, where $\Delta Hcj_C$ is a difference in coercivity between a portion having a highest coercivity and a portion having a lowest coercivity on a straight line that passes through a central part of the first main surface and is perpendicular to the first main surface, and $\Delta Hcj_E$ is a difference in coercivity between a portion having a highest coercivity on the first side surface and a portion having a lowest coercivity on the first side surface.

When $|\Delta Hcj_C - \Delta Hcj_E|$ is small, a difference between unevenness in coercivity on a perpendicular line drawn perpendicularly to the first main surface from a central part of the first main surface and unevenness in coercivity on a perpendicular line drawn perpendicularly to the first main surface from a portion close to the first side surface of the first main surface is small.

In yet another mode of the present invention, it is preferable that $\Delta Hcj_E > \Delta Hcj_M$ is satisfied, where $\Delta Hcj_E$ is a difference in coercivity between a portion having a highest coercivity on the first side surface and a portion having a lowest coercivity on the first side surface.

The case where $\Delta Hcj_E > \Delta Hcj_M$ is satisfied means that unevenness in coercivity in the first main surface is smaller than unevenness in coercivity in the first side surface.

The R-T-B based sintered magnet of the present invention preferably has a thickness in a perpendicular direction to the first main surface is 1.5 to 9 mm.

In yet another mode of the present invention, it is preferable that a coercivity decreases monotonically from the first main surface to a point $HC_{min}$, and the coercivity increases monotonically from the point $HC_{min}$ to a second main surface, where the point $HC_{min}$ is a point having a lowest coercivity on a straight line that passes through a central part of the first main surface and is perpendicular to the first main surface and the second main surface is opposite to the first main surface.

In yet another mode of the present invention, it is preferable that a coercivity decreases monotonically from the first main surface to a second main surface along a straight line that passes through a central part of the first main surface and is perpendicular to the first main surface, where the second main surface is opposite to the first main surface.

Moreover, an R-T-B based sintered magnet in which two or more of the above-mentioned R-T-B based sintered magnets are coupled to each other is also an R-T-B based sintered magnet of the present invention.

Moreover, a motor of the present invention includes the above-mentioned R-T-B based sintered magnet.

Moreover, an R-T-B based sintered magnet according to one mode of the present invention is obtained by a method for manufacturing an R-T-B based sintered magnet, including: a pressing step of pressing a raw material powder to obtain a green compact having the first main surface and the first side surface; a sintering step of sintering the green compact to obtain a sintered body; and a grain boundary diffusion step of grain boundary diffusing a heavy rare earth element in the sintered body, the method being characterized in that in the grain boundary diffusion step, the heavy rare earth element is coated only on a main surface of one surface or opposing two surfaces.

DESCRIPTION OF THE PREFERRED EMBODIMENTS

Figure 1A:
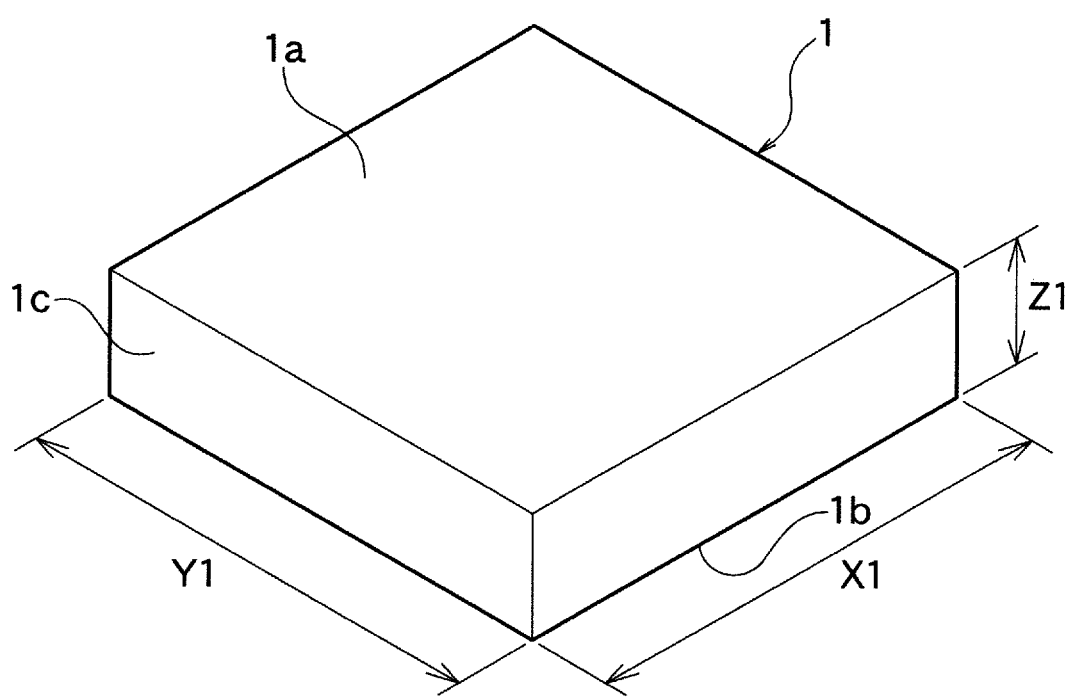
FIG. 1A is an external view of an R-T-B based sintered magnet according to an embodiment of the present invention.
Figure 1A:
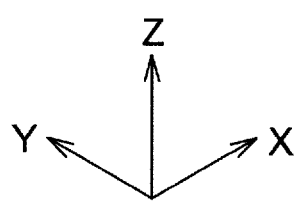

Hereafter, the present invention will be described based on embodiments shown in the drawings.

<R-T-B Based Sintered Magnet>

An R-T-B based sintered magnet according to the present embodiment includes a particle (crystal grain) configured from an $R_2T_{14}B$ crystal and a grain boundary.

"R" represents at least one kind of rare earth elements. Rare earth elements refer to Sc, Y, and a lanthanoid belonging to group 3 in the long-period periodic table. Lanthanoid elements include, for example, La, Ce, Pr, Nd, Sm, Eu, Gd, Tb, Dy, Ho, Er, Tm, Yb, Lu, and so on.

An amount of "R" is preferably 28 mass % and not more than 33 mass %, and is more preferably not less than 29.5 mass % and not more than 31.5 mass %. By setting the amount of "R" in the above-mentioned range, magnetic characteristics and residual magnetic flux density improve.

"T" represents Fe, or Fe and Co. Furthermore, it may include one or more kind selected from other transition metal elements.

An amount of Co preferably has a range of not less than 0.3 mass % to not more than 5 mass %, and is more preferably set to not less than 0.4 mass % and not more than 2.5 mass %. By setting the amount of Co in the above-mentioned range, coercivity and corrosion resistance improve.

An amount of Fe is a substantive remainder in configuration elements of the R-T-B based sintered magnet.

"B" represents boron (B), or boron (B) and carbon (C).

An amount of "B" is preferably not less than 0.7 mass % and not more than 1.1 mass %, is more preferably not less than 0.8 mass % and not more than 1.0 mass %, and is even more preferably not less than 0.88 mass % and not more than 0.98 mass %. By setting the amount of "B" in the above-mentioned range, residual magnetic flux density and coercivity improve.

An amount of C changes and is appropriately determined by the likes of another parameter. Furthermore, the R-T-B based sintered magnet according to the present embodiment may include the likes of Cu or Al. Adding these elements enables improvements in high coercivity rendering, high corrosion resistance rendering, or temperature characteristics.

Furthermore, the R-T-B based sintered magnet according to the present embodiment preferably includes Dy, Tb, or both of those, as a heavy rare earth element.

The heavy rare earth element may be included in the crystal grain and the grain boundary. The heavy rare earth element, when not substantively included in the crystal grain, is preferably included in the grain boundary.

A concentration of the heavy rare earth element in the grain boundary is preferably higher than its concentration in the crystal grain.

The R-T-B based sintered magnet according to the present embodiment is preferably an R-T-B based sintered magnet in which a heavy rare earth element has been grain boundary diffused. An R-T-B based sintered magnet in which a heavy rare earth element has been grain boundary diffused can improve residual magnetic flux density and coercivity by a smaller amount of the heavy rare earth element compared to an R-T-B based sintered magnet in which a heavy rare earth element has not been grain boundary diffused.

Figure 8A:
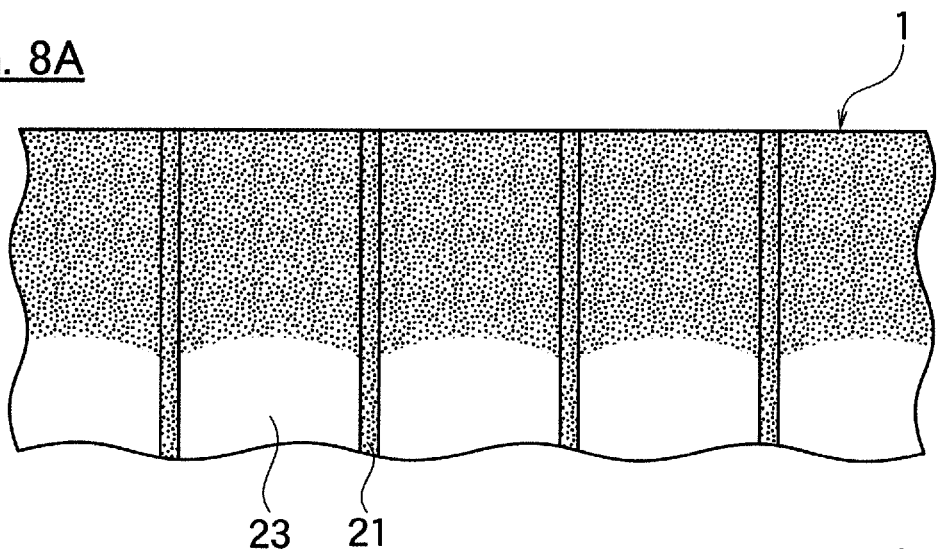
FIG. 8A is a schematic view showing a mode of A-type diffusion.
Figure 8B:
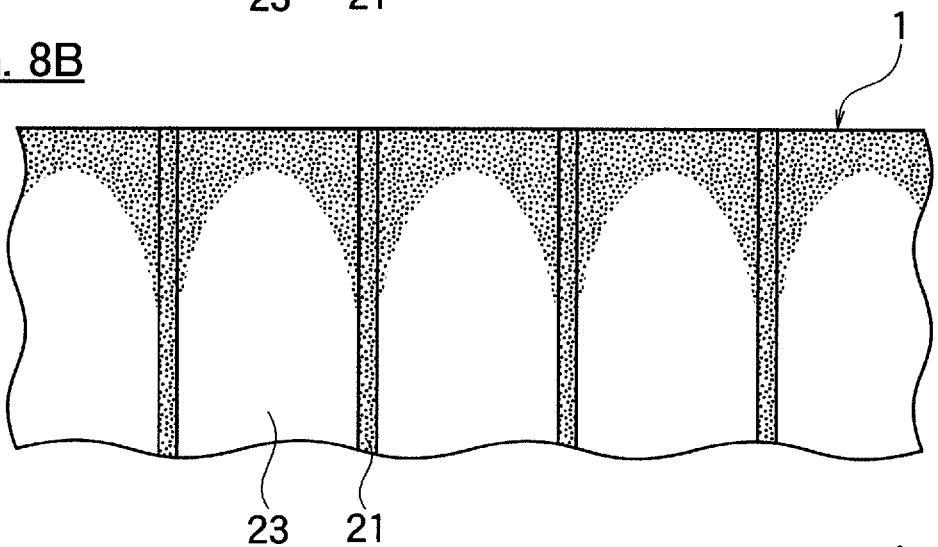
FIG. 8B is a schematic view showing a mode of B-type diffusion.
Figure 8C:
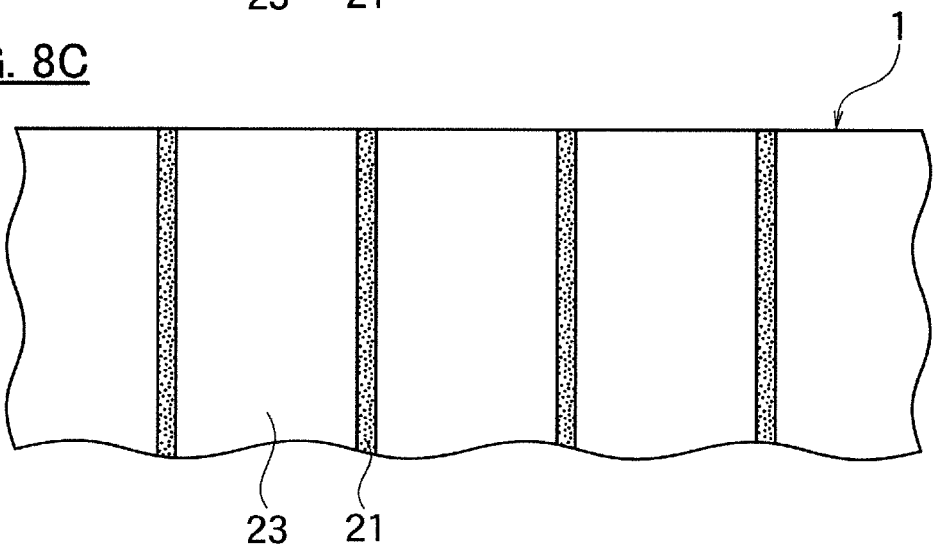
FIG. 8C is a schematic view showing a mode of C-type diffusion.

Regarding grain boundary diffusion, the Harrison diffusion classification model, which models states of diffusion, is known. According to the Harrison diffusion classification model, diffusion is classified into A-type, B-type, and C-type. FIGS. 8A to 8C are schematic views showing states of an element diffusing in grain boundaries 21 and crystal grains 23 of an R-T-B based sintered rare earth magnet 1. FIG. 8A is A type, FIG. 8B is B-type, and FIG. 8C is C-type. The hatched portion in each figure represents a portion where the element (a heavy rare earth element in the present embodiment) has diffused. Note that in FIGS. 8A to 8C, the element diffuses from the top to the bottom of the figure.

As shown in FIG. 8A, in the case of A-type, the heavy rare earth element diffuses also inside the crystal grains 23 as well as in the grain boundaries 21. That is, in the case of A-type, diffusion to inside the particles proceeds. In contrast, as shown in FIG. 8C, in the case of C-type, the heavy rare earth element does not diffuse to the inside of the crystal grains 23, and the heavy rare earth element diffuses only in the grain boundaries 21. As shown in FIG. 8B, the case of B-type is intermediate between the case of A-type and the case of C-type.

In the present embodiment, a concentration of the heavy rare earth element (Dy, Tb, or both of those) in the grain boundary 21 is preferably higher compared to a concentration of the heavy rare earth element in the crystal grain 23, and the heavy rare earth element most preferably diffuses only in the grain boundaries 21. Thus, the diffusion is preferably predominated by B-type or C-type, and is particularly preferably predominated by C-type. When the concentration of the heavy rare earth element in the grain boundaries 21 is high, it becomes possible to efficiently improve coercivity by a small amount of the heavy rare earth element.

As measuring methods of various kinds of components included in the R-T-B based sintered magnet according to the present embodiment, methods generally known in the past can be employed. Amounts of each kind of metal element are measured by X-ray fluorometry (XRF), an amount of oxygen is measured by an inert gas fusion-non-dispersive infrared absorption method, and an amount of carbon is measured by a combustion in an oxygen airflow-infrared absorption method. In cases where a measurement sample is small or a contained metal element amount is a minute amount, inductively coupled plasma emission spectroscopic analysis (ICP-AES) is employed.

Note that composition of the R-T-B based sintered magnet according to the present invention is not limited to the above-mentioned composition.

FIG. 1A is an external view showing an R-T-B based sintered rare earth magnet 1 according to the present embodiment. The R-T-B based sintered rare earth magnet 1 is formed in a rectangular parallelepiped shape by a first main surface 1a and a second main surface 1b that are parallel to a XY plane, and four side surfaces 1c perpendicular to the XY plane. Any of the four side surfaces is assumed to be a first side surface. Note that the opposing two main surfaces 1a and 1b may not be parallel to each other, and opposing any two side surfaces 1c may not be parallel to each other either. In the present embodiment, the two main surfaces 1a and 1b have areas larger than those of the four side surfaces 1c.

Figure 1B:
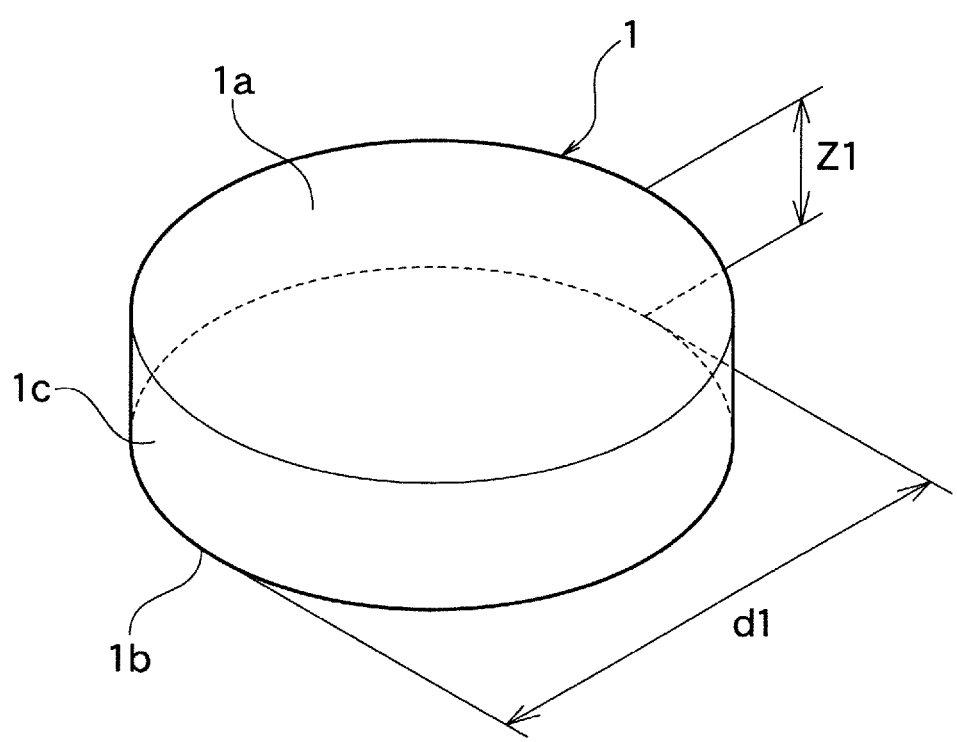
FIG. 1B is an external view of an R-T-B based sintered magnet according to another embodiment of the present invention.

The R-T-B based sintered rare earth magnet 1 according to the present embodiment is not limited to a rectangular parallelepiped. For example, as shown in the external view of FIG. 1B, it may have a circular column shape.

Figure 1C:
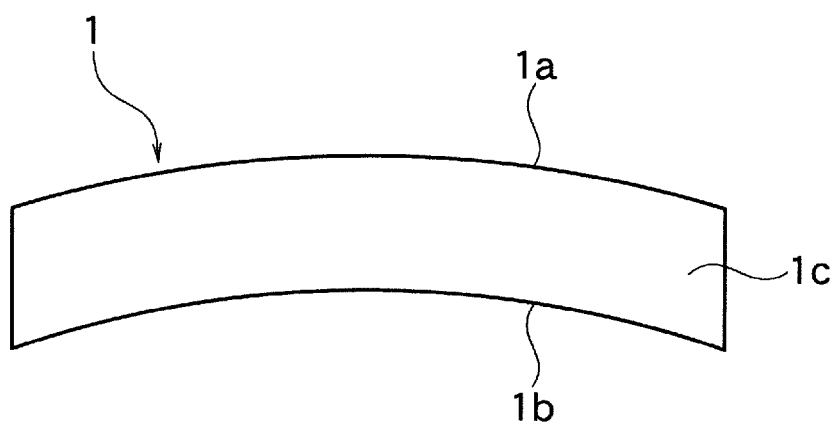
FIG. 1C is a side view of an R-T-B based sintered magnet according to another embodiment of the present invention.
Figure 1D:
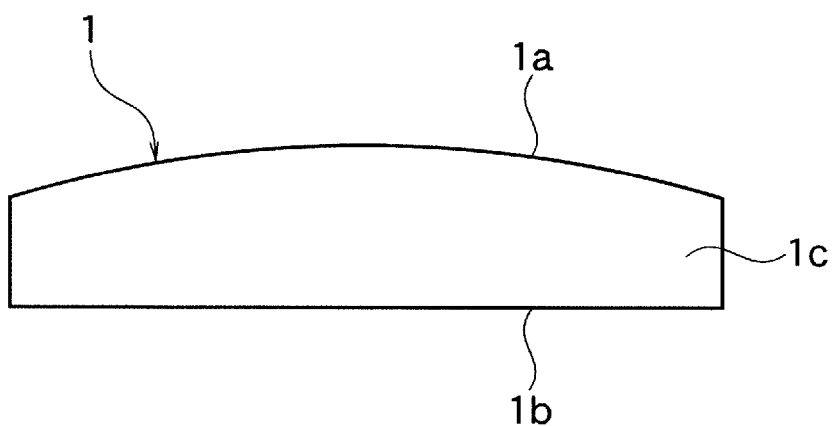
FIG. 1D is a side view of an R-T-B based sintered magnet according to another embodiment of the present invention.

Moreover, the two main surfaces 1a and 1b may be curved surfaces as shown in the side view of FIG. 1C, or one of the main surfaces 1a may be a curved surface and the other main surface 1b may be a plane surface as shown in the side view of FIG. 1D.

Furthermore, either of the main surfaces may be concave.

Dimensions of the R-T-B based sintered magnet 1 according to the present embodiment are not particularly limited, and appropriate dimensions should be set according to an application. For example, in the case of the R-T-B based sintered magnet 1 of rectangular parallelepiped shape shown in FIG. 1A, dimensions should be set to about X1=10 to 100 mm, Y1=10 to 100 mm, and Z1=1.5 to 9 mm. In the case of the R-T-B based sintered magnet 1 of circular column shape shown in FIG. 1B, dimensions should be set to about d1=10 to 100 mm and Z1=1.5 to 9 mm.

In particular, Z1, which is a thickness in a perpendicular direction to the first main surface 1a, is preferably 1.5 to 9 mm, and more preferably 2 to 7 mm. Z1 is preferably in the above-mentioned range because when performing grain boundary diffusion processing of the heavy rare earth element from the main surfaces 1a and 1b of the R-T-B based sintered rare earth magnet 1, the heavy rare earth element easily diffuses to a central part of the magnet.

Now, in the present embodiment, coating the heavy rare earth element only on the first main surface 1a of the R-T-B based sintered rare earth magnet 1 will be called one-surface coating, and coating the heavy rare earth element on the two surfaces of the opposing first main surface 1a and second main surface 1b will be called two-surface coating. Moreover, the present embodiment is explained using the term "coating" for convenience, but is not limited to "coating" as explained in a grain boundary diffusion step mentioned below.

When Z1 is thicker than 3 mm, the two-surface coating is preferable. When Z1 is 2 to 3 mm, either the one-surface coating or the two-surface coating is fine. When Z1 is thinner than 2 mm, the one-surface coating is preferable.

Now, when a total amount of the heavy rare earth element coated is fixed, a coating amount of the one-surface coating is double of a coating amount per one surface of the two-surface coating. Moreover, the thinner Z1 is, the more the total amount of the heavy rare earth element coated decreases.

The one-surface coating is preferable when Z1 is thinner than 2 mm because if the two-surface coating is performed when Z1 is thinner than 2 mm, the coating amount of the heavy rare earth element per one surface decreases, and a heavy rare earth element adhering layer may not be able to be formed. When a heavy rare earth element adhering layer cannot be formed, there may be a case that the heavy rare earth element cannot exist uniformly on a coating surface, and an excessive unevenness in coercivity occurs.

In the R-T-B based sintered magnet 1 according to the present embodiment, the first main surface 1a has a coercivity that is higher than that of the first side surface 1c. When $\Delta Hcj_M$ is a difference in coercivity between a portion having a highest coercivity and a portion having a lowest coercivity on the first main surface 1a, $\Delta Hcj_M \leq 60$ kA/m is satisfied. When $\Delta Hcj_G$ is a difference in coercivity between a portion having a highest coercivity and a portion having a lowest coercivity on a horizontal cross section (first cross section) parallel to the first main surface 1a and spaced from the first main surface 1a at a predetermined length or more, $\Delta Hcj_G \leq 60$ kA/m is satisfied.

Areas of the first main surface 1a or a portion on a horizontal cross section parallel to the first main surface 1a are not particularly limited, but are preferably 1 mm$^2$ to 100 mm$^2$ from a viewpoint of coercivity measurement.

In the present embodiment, a coercivity of a predetermined portion is equal to a coercivity of a coercivity measurement sample obtained by cutting out a region including the predetermined portion and having a volume.

The region having a volume has any shape such as rectangular parallelepiped and cube. For example, a rectangular parallelepiped or cube whose one side is 1 mm to 10 mm may be set. Moreover, a volume per one region that should be measured may be set to 1 mm$^3$ to 1000 mm$^3$. In the present embodiment, the region has a shape of a coercivity measurement sample 11 shown in FIG. 2B, that is, a rectangular parallelepiped of X2×Y2×Z2.

The predetermined length is, for example, a length of one half of an interval (Z1 in FIG. 1A) between the first main surface 1a and the second main surface 1b.

In the present embodiment, a coercivity of the first main surface 1a is preferably higher than a coercivity of the first side surface 1c by at least 1 kA/m or more. Note that a coercivity of a surface refers to an average coercivity averaging coercivities of all portions on the surface.

$\Delta Hcj_M$ preferably satisfies 5 kA/m≤$\Delta Hcj_M$≤40 kA/m, and more preferably satisfies 5 kA/m≤$\Delta Hcj_M$≤kA/m. Moreover, $\Delta Hcj_G$ preferably satisfies 5 kA/m≤$\Delta Hcj_G$≤40 kA/m, and more preferably satisfies 5 kA/m≤$\Delta Hcj_G$≤20 kA/m. The reason why a preferable range of $\Delta Hcj_M$ and $\Delta Hcj_G$ has a lower limit is that it is more preferable for unevenness in coercivity of the first main surface 1a, the horizontal surface, or both of those to exist in a certain range, compared to when there is absolutely no unevenness in coercivity. A coercivity of a central part becomes comparatively high due to existence of unevenness within a certain range, and an effect of advanced heat demagnetization characteristics is thus obtained.

Figure 2A:
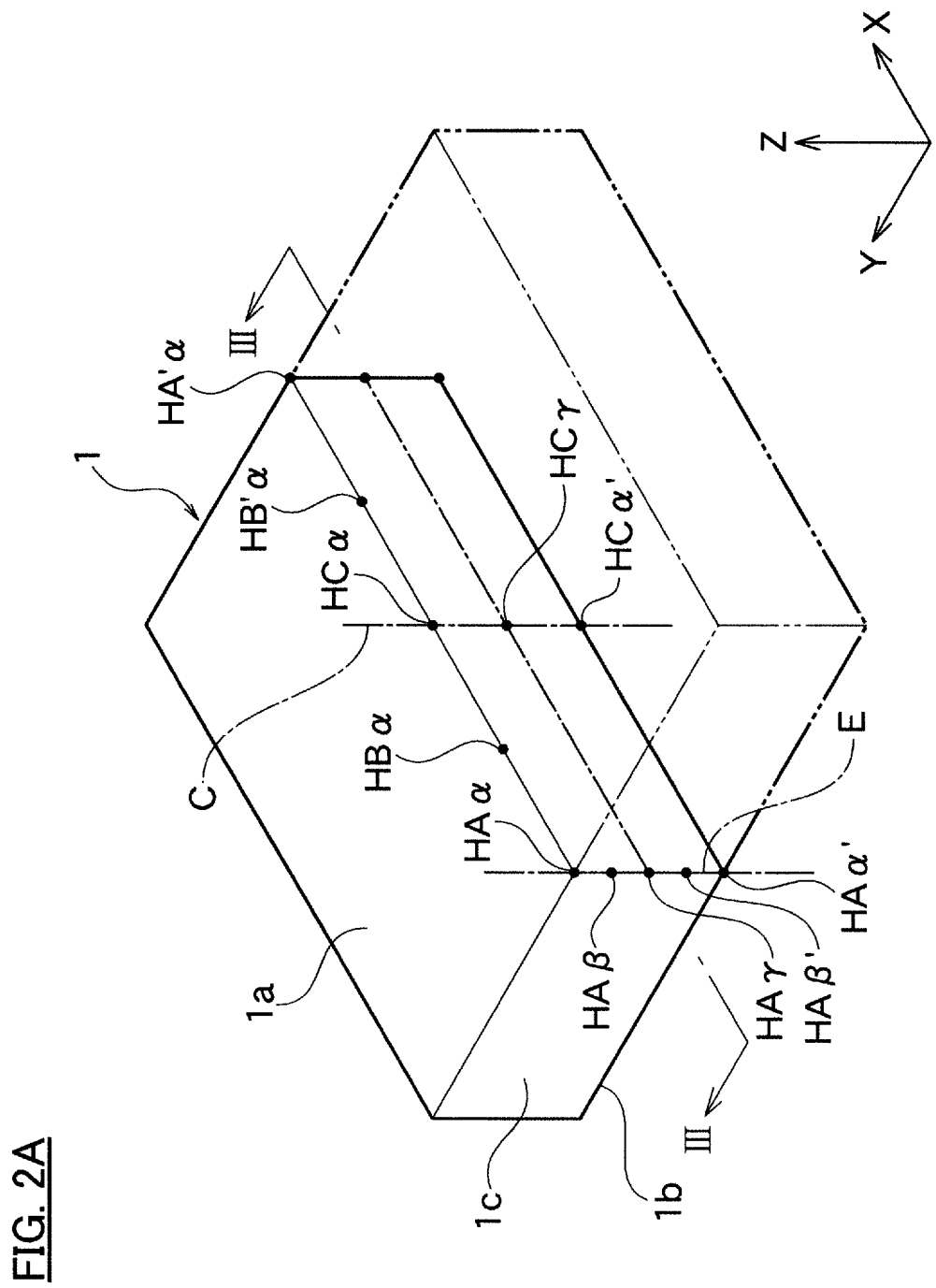
FIG. 2A is an external view in which an R-T-B based sintered magnet according to an embodiment of the present invention has been cut in a plane perpendicular to its main surface.
Figure 2B:
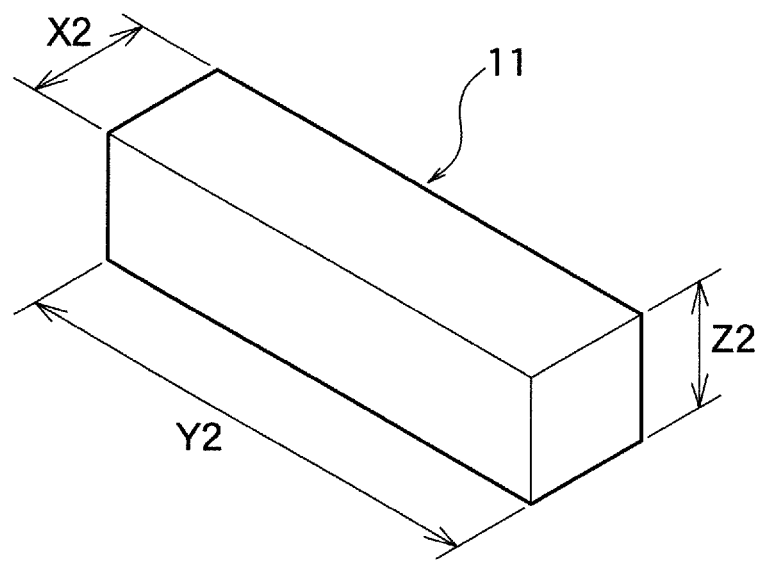
FIG. 2B is an external view of a coercivity measurement sample.
Figure 2B:
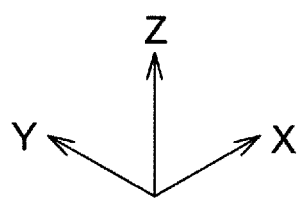
Figure 3A:
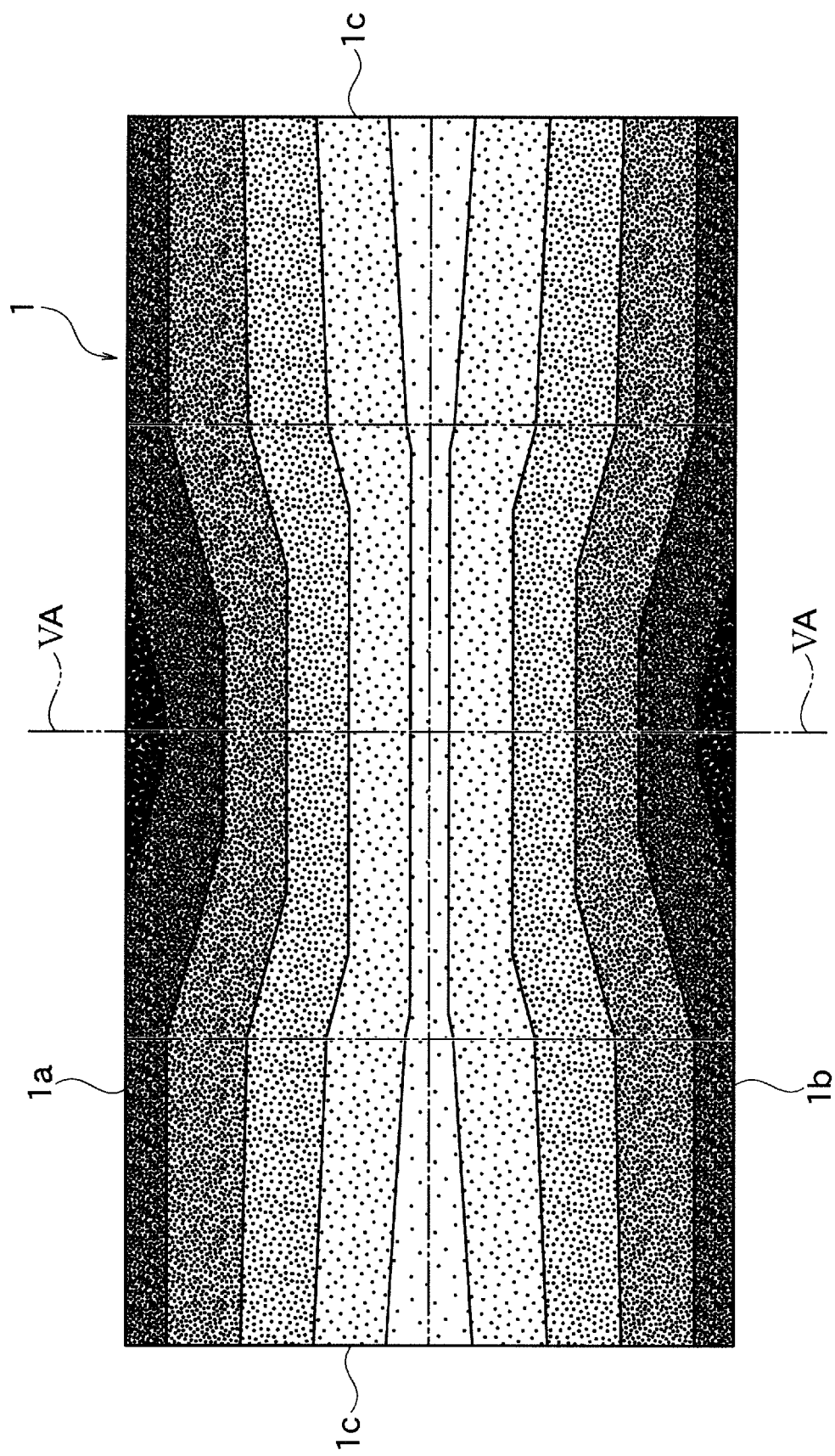
FIG. 3A is a schematic view showing a coercivity distribution in an R-T-B based sintered magnet according to an embodiment of the present invention.
Figure 4:
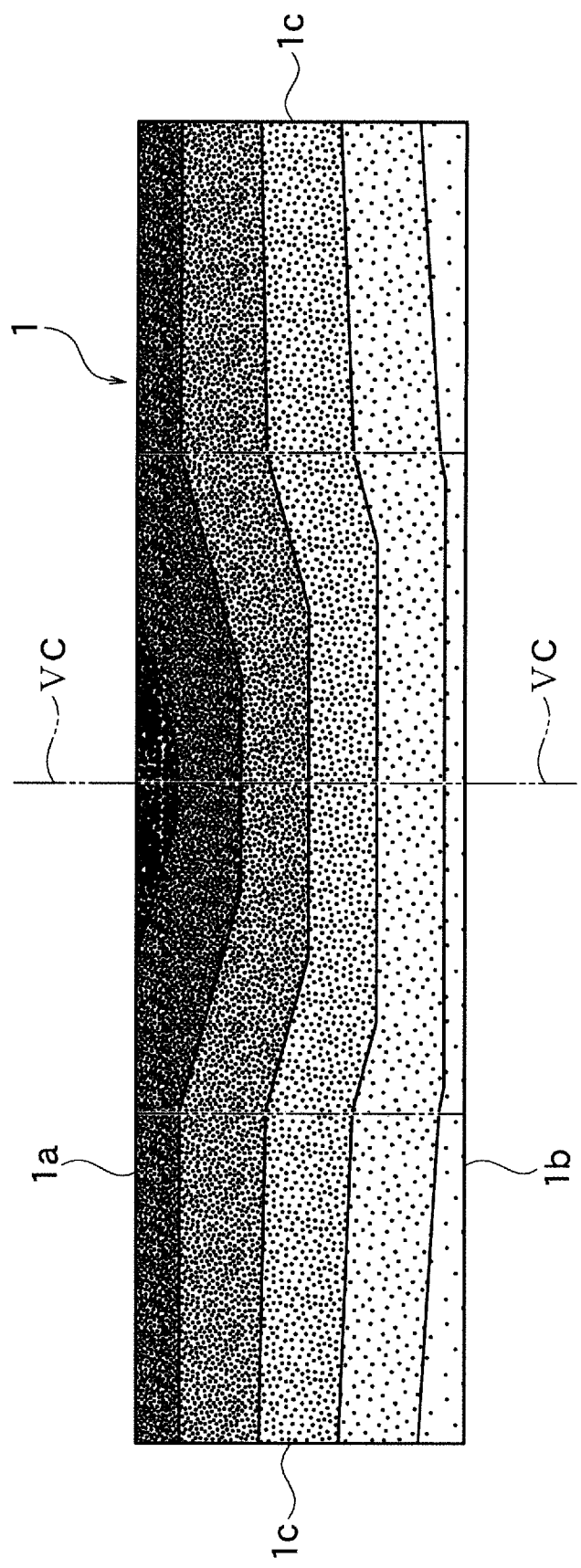
FIG. 4 is a schematic view showing a coercivity distribution in an R-T-B based sintered magnet according to an embodiment of the present invention.

FIG. 2A is an external view where the R-T-B based sintered rare earth magnet 1 according to the present embodiment has been cut in a cross section perpendicular to its main surfaces. Note that the two dot-chain line of FIG. 2A represents a portion removed by cutting. FIG. 3A and FIG. 4 are a schematic view of coercivity distribution of a cross section in which the R-T-B based sintered rare earth magnet 1 according to the present embodiment shown in FIG. 2A has been cut by a cross section line FIG. 3A shows a coercivity distribution where a grain boundary diffusion processing has been implemented on the first main surface 1a and the second main surface 1b, and FIG. 4 shows a coercivity distribution where a grain boundary diffusion processing has been implemented only on the first main surface 1a. Note that the coercivity distributions shown in FIG. 3A and FIG. 4 are an example, and are not limited thereto.

Figure 3B:
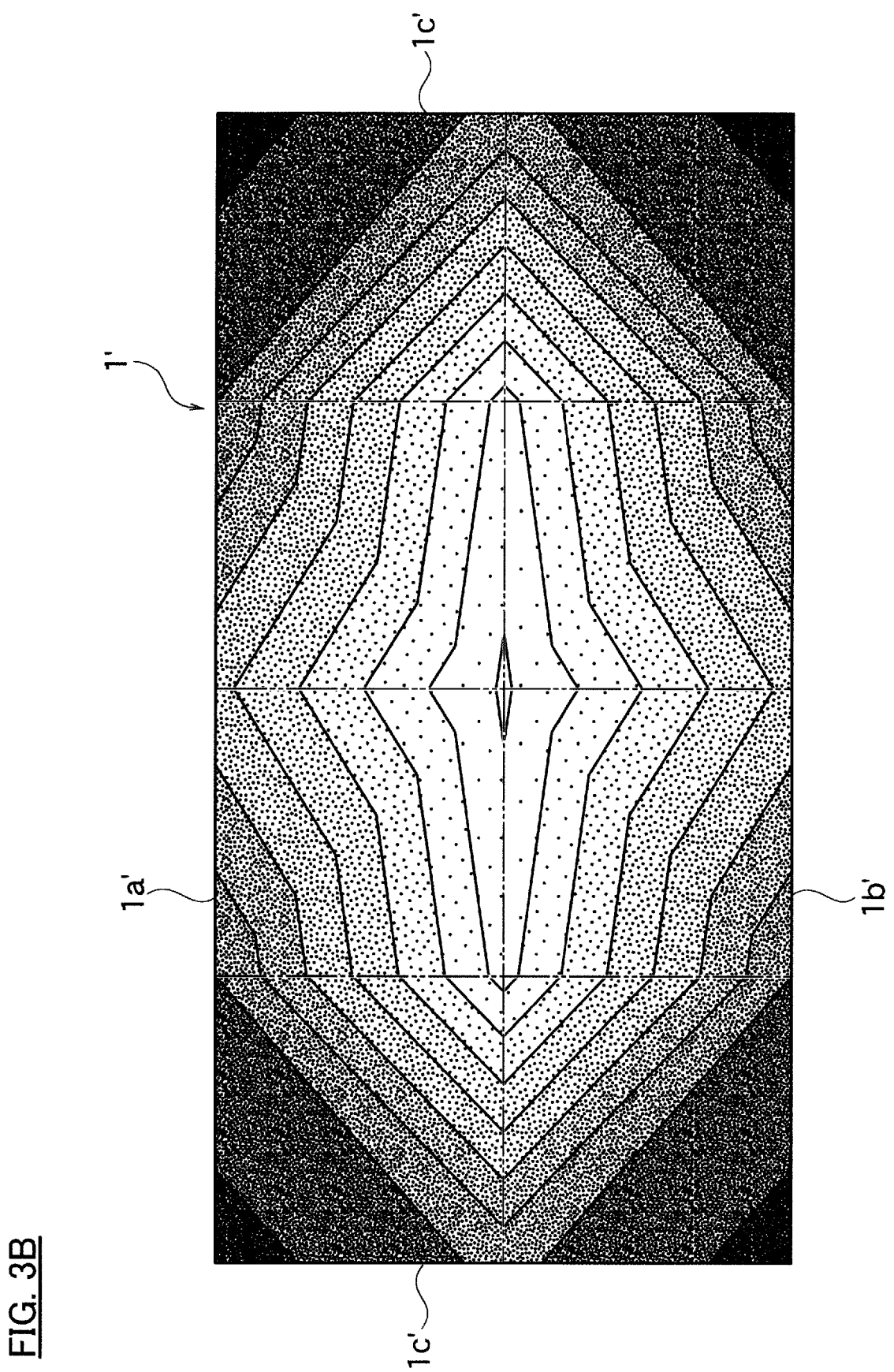
FIG. 3B is a schematic view showing a coercivity distribution in an R-T-B based sintered magnet corresponding to a conventional example.

FIG. 3B is a schematic view of a coercivity distribution of a cross section of a conventional R-T-B based sintered rare earth magnet 1' where a grain boundary diffusion processing is implemented on all six surfaces of its two main surfaces 1a' and 1b' and four side surfaces 1c'.

In FIG. 3A, FIG. 4, and FIG. 3B, the darker the black color (the larger the number of dots) of a portion is, the higher the coercivity of that portion is, and the lighter the black color (the smaller the number of dots) of a portion is, the lower the coercivity of that portion is. Moreover, within each of the portions partitioned by solid lines, a coercivity is within a predetermined range, and a coercivity is substantively equal. Note that an intensity of black color (number of dots) represents a relative magnitude of coercivity in the plurality of portions in each figure. The intensity of black color (number of dots) does not represent relative magnitude of coercivity between different figures.

As shown in FIG. 3A, coercivity of the R-T-B based sintered magnet 1 of the present embodiment hardly changes in a parallel direction to the main surfaces (first main surface 1a and second main surface 1b). In contrast, there is a gradient of coercivity in a perpendicular direction to the main surfaces, and coercivity lowers from the first main surface 1a and second main surface 1b of the magnet to the inside of the magnet.

Moreover, as shown in FIG. 4, coercivity of the R-T-B based sintered magnet 1 of the present embodiment sometimes may have a distribution where coercivity of one main surface (first main surface 1a) of the magnet is maximum, and coercivity of the other main surface (second main surface 1b) of the magnet is minimum.

In the distributions of both FIG. 3A and FIG. 4, coercivity hardly changes in the parallel direction to the main surface (first main surface 1a), that is, $\Delta Hcj_M$ and $\Delta Hcj_G$ are small.

Moreover, in the present embodiment, a difference between a portion where coercivity is highest and a portion where coercivity is lowest on a straight line C that passes through a point HCα shown in FIG. 2A and is perpendicular to the first main surface 1a, that is, a difference ($\Delta Hcj_C$) between a portion where coercivity is highest and a portion where coercivity is lowest among a plurality of portions including the straight line C preferably satisfies 5 kA/m≤$\Delta Hcj_C$≤80 kA/m.

Now, the point HCα of FIG. 2A is a point at a central part of the first main surface 1a. Moreover, a portion on the straight line C refers to a portion including the straight line C with a specific length. For example, the specific length may be set to 1 mm to 10 mm. Coercivity of a specific portion on the straight line C in the present embodiment is equal to coercivity of a coercivity measurement sample obtained by cutting out a portion including the straight line C with the previously mentioned specific length.

Hereafter, a method for determining the central part of the first main surface 1a will be described. In the present embodiment, the central part of the first main surface 1a is a portion including a point on the first main surface 1a whose distance from a centroid of the first main surface 1a is smallest. For example, in the embodiment shown in FIG. 1A, a portion including the centroid of the first main surface 1a is assumed to be the central part of the first main surface 1a. Moreover, when the centroid of the first main surface 1a is not on the first main surface 1a, a portion including a point on the first main surface 1a closest to the centroid of the first main surface 1a is assumed to be the central part.

In addition, the distribution of FIG. 3A and the distribution of FIG. 4 are also characterized in that both coercivities going from any point of the main surface perpendicularly to the inside of the magnet change in a similar manner. Specifically, |$\Delta Hcj_C$−$\Delta Hcj_E$|≤20 kA/m is preferably satisfied, where $\Delta Hcj_E$ is a difference in coercivity between a portion having a highest coercivity and a portion having a lowest coercivity on a straight line E that passes through the point HAα shown in FIG. 2A and is perpendicular to the first main surface.

|$\Delta Hcj_C$−$\Delta Hcj_E$| refers to a difference between unevenness in coercivity on the straight line C passing through the central part of the R-T-B based sintered magnet 1 and unevenness in coercivity on the straight line E passing through a side surface of the R-T-B based sintered magnet 1.

When the heavy rare earth element is sufficiently diffused in the central part of the magnet, unevenness in coercivity on the straight line C passing through the central part of the R-T-B based sintered magnet 1 decreases, and the difference between Mick and $\Delta Hcj_E$ decreases.

Furthermore, $\Delta Hcj_E$>$\Delta Hcj_M$ is preferably satisfied. Satisfying $\Delta Hcj_E$>$\Delta Hcj_M$ means that unevenness in coercivity within the first side surface is larger than unevenness in coercivity within the first main surface.

Moreover, in the R-T-B based sintered magnet of the present embodiment, $\Delta Hcj_M$ and $\Delta Hcj_G$ tend to be lower compared to $\Delta Hcj_C$ and $\Delta Hcj_E$.

Figure 5A:
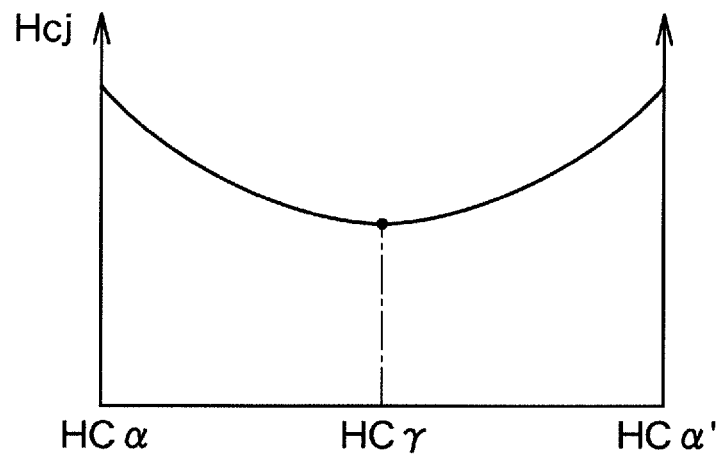
FIG. 5A is a schematic view showing trend in coercivity within the R-T-B based sintered magnet on VA shown in FIG. 3A.
Figure 5B:
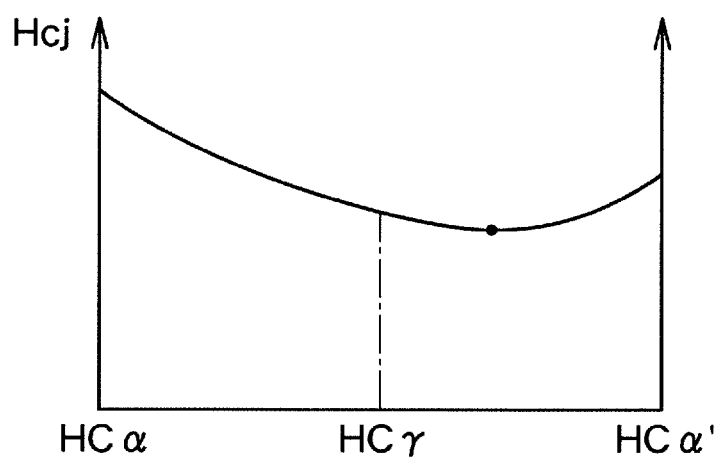
FIG. 5B is a schematic view showing trend in coercivity within an R-T-B based sintered magnet according to an embodiment of the present invention.
Figure 5C:
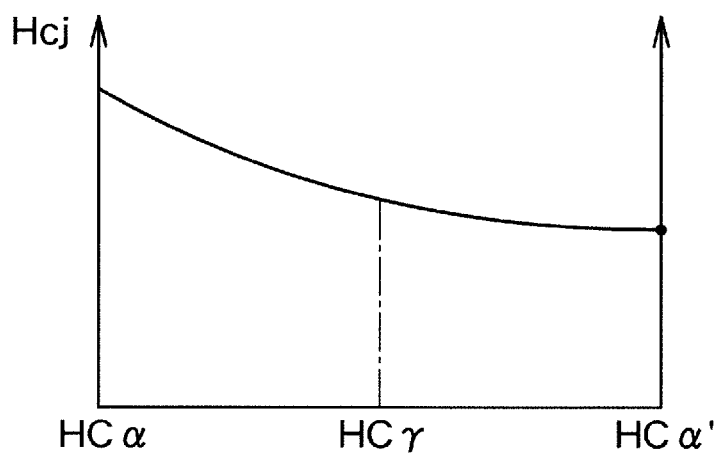
FIG. 5C is a schematic view showing trend in coercivity within the R-T-B based sintered magnet on VC shown in FIG. 4.

FIG. 5A is a schematic view in which coercivity trend on a straight line VA of FIG. 3A, that is, coercivity trend in a portion on the straight line VA of FIG. 3A is made into a graph, and FIG. 5C is a schematic view in which coercivity trend on a straight line VC of FIG. 4 is made into a graph. FIG. 5A is a schematic view in which coercivity trend on the straight line VA of FIG. 3A is made into a graph, and FIG. 5C is a schematic view in which coercivity trend on the straight line VC of FIG. 4 is made into a graph.

In FIG. 5A, coercivity is maximum at point HCα and point HCα', and coercivity is minimum at point HCγ. Moreover, coercivity decreases monotonically from point HCα to point HCγ, and coercivity increases monotonically from point HCγ to point HCα'. In FIG. 5C, coercivity is maximum at point HCα, and coercivity is minimum at point HCα'. Moreover, coercivity decreases monotonically from point HCα to point HCα'.

Coercivity trend as in FIG. 5A is obtained when the same amount of the heavy rare earth element is coated on the first main surface and the second main surface in the grain boundary diffusion step. Coercivity trend as in FIG. 5C is obtained when the heavy rare earth element is coated only on the first main surface in the grain boundary diffusion step.

Coercivity distributions in the present embodiment are not limited to those of FIG. 5A and FIG. 5C. The point where coercivity is minimum may be anywhere provided it is between point HCα and point HCα', as in FIG. 5B. A coercivity distribution like that of FIG. 5B is attained when, for example, the first main surface and the second main surface are respectively coated with different amounts of the heavy rare earth element.

The above-mentioned R-T-B based sintered magnet according to the present embodiment has desired magnetic characteristics. Specifically, it is possible to obtain an R-T-B based sintered magnet in which a used amount of the heavy rare earth element is more reduced than in a conventional R-T-B based sintered magnet and in which manufacturing steps are more simplified thereby reducing manufacturing costs more than in a conventional R-T-B based sintered magnet, and which at the same time excels in magnetic characteristics (residual magnetic flux density, coercivity, and heat demagnetization characteristics).

The R-T-B based sintered magnet 1 according to the present embodiment has higher heat demagnetization characteristics when the unevenness in coercivity on the straight line passing through the central part of the R-T-B based sintered magnet 1 is smaller.

In contrast, coercivity of the conventional R-T-B based sintered magnet 1' is maximum at the four corners in the cross section shown in FIG. 3B, and lowers as the central part of the magnet is approached. That is, there is a gradient of coercivity in a parallel direction to the first main surface 1a'. In other words, $\Delta Hcj_M$ and $\Delta Hcj_G$ are large.

Note that the four corners of the cross section shown in FIG. 3B correspond to a ridgeline of the conventional R-T-B based sintered magnet 1'. Moreover, regarding the conventional R-T-B based sintered magnet 1' in its entirety, coercivity of the eight corners (not shown) is maximum.

Moreover, coercivity of the central part of the magnet is considerably lower compared to coercivity of portions close to the first main surface 1a', the second main surface 1b', or the side surface 1c' of the magnet, hence $|\Delta Hcj_C - \Delta Hcj_E|$ tends to increase.

The inventors of the present invention consider that heat demagnetization characteristics of the R-T-B based sintered magnet of the present embodiment excel because unevenness in coercivity of the R-T-B based sintered magnet of the present embodiment is small. Although the reason why unevenness in coercivity has a large effect on heat demagnetization characteristics is unclear, it is conceivable that a place where coercivity is relatively low acts as a source whereby magnetization inversion occurs, hence an R-T-B based sintered magnet having large unevenness in coercivity are inferior in heat demagnetization characteristics.

The R-T-B based sintered magnet 1 of the present embodiment having the coercivity distribution of FIG. 3A has high coercivity to the central part of the magnet. Thus, there is no place conceivably acting as a demagnetization source due to relatively low coercivity. In contrast, in the conventional R-T-B based sintered magnet 1' having the coercivity distribution of FIG. 3B, coercivity of the central part of the magnet is low. Thus, there is a place conceivably acting as a demagnetization source due to relatively low coercivity.

For the above reasons, the R-T-B based sintered magnet 1 of the present embodiment is considered to have heat demagnetization characteristics that excel more compared to those of the conventional R-T-B based sintered magnet 1'.

Moreover, it is not the case that the smaller the unevenness in coercivity is, the better it is, and unevenness preferably exists in a certain range. For example, the reason why $\Delta Hcj_C$ is preferably 5 kA/m or more is that demagnetization characteristics (particularly heat demagnetization characteristics) are excellent when coercivity of the central part of the R-T-B based sintered magnet is suitably higher than that of the surface of the R-T-B based sintered magnet.

<Method for Manufacturing R-T-B Based Sintered Magnet>

Next, a method for manufacturing the R-T-B based sintered magnet according to the present embodiment will be described.

Note that hereafter, an R-T-B based sintered magnet produced by a powder metallurgy method and having a heavy rare earth element grain boundary diffused therein will be described as an example, but the method for manufacturing the R-T-B based sintered magnet according to the present embodiment is not particularly limited, and another method may also be employed.

The method for manufacturing the R-T-B based sintered magnet according to the present embodiment includes: a pressing step of pressing a raw material powder to obtain a green compact; a sintering step of sintering the green compact to obtain a sintered body; and a grain boundary diffusion step of grain boundary diffusing a heavy rare earth element in the sintered body.

The manufacturing method according to the present embodiment makes it possible to control the coercivity distribution in the above-mentioned modes and to improve heat demagnetization characteristics.

Hereafter, the method for manufacturing the R-T-B based sintered magnet will be described in detail, but publicly-known methods should be employed for matters not specially mentioned.

[Raw Material Powder Preparation Step]

The raw material powder may be produced by a publicly-known method. In the present embodiment, the case of a one alloy method where a single alloy is used will be described, but a so-called two alloy method where two alloys of a first alloy and a second alloy are mixed to produce the raw material powder may be also employed.

First, raw material metals corresponding to a composition of the R-T-B based sintered magnet according to the present embodiment are melted by a publicly-known method, and then an alloy having a desired composition is produced by casting.

After producing the alloy, the produced alloy is pulverized (pulverizing step). The pulverizing step may be implemented in two steps, or may be implemented in one step. A pulverizing method is not particularly limited. For example, the pulverizing step is implemented by a method employing various kinds of pulverizers.

[Pressing Step]

In the pressing step, a pulverized powder obtained by the pulverizing step is pressed into a predetermined shape. The pressing step is not particularly limited, but in the present embodiment, the pulverized powder is filled inside a mold and is pressurized in a magnetic field.

Pressurization during the pressing is preferably performed at 20 MPa to 300 MPa. The magnetic field applied is preferably 950 kA/m to 1600 kA/m. A shape of the green compact obtained by pressing the pulverized powder is not particularly limited, and it is possible to adopt any shape according to a desired shape of the R-T-B based sintered magnet, such as a rectangular parallelepiped, a flat plate shape, and a column shape, for example.

[Sintering Step]

The sintering step is a step where the green compact is sintered in a vacuum or an inert gas atmosphere to obtain the sintered body. A sintering temperature needs to be adjusted according to various conditions such as composition, pulverizing method, and difference between particle diameter and particle diameter distribution, but the green compact is sintered by, for example, performing heating processing thereto in a vacuum or in the presence of an inert gas, at 1000° C. to 1200° C., for one hour to 20 hours. As a result, a high density sintered body is obtained. Note that at this time point, there is preferably a substantively uniform coercivity distribution over the entire sintered body.

[Grain Boundary Diffusion Step]

The present embodiment includes a step of grain boundary diffusing the heavy rare earth element in the previously described sintered body. The grain boundary diffusion can be implemented by adhering the heavy rare earth element, by the likes of coating or vapor deposition, to a surface of the sintered body that has undergone a pre-processing as required, and then performing heat processing. As a result, coercivity of the finally obtained R-T-B based sintered magnet can be further improved. Note that content of the pre-processing is not particularly limited. For example, there may be a pre-processing of implementing etching by a publicly-known method, and then performing cleaning and drying.

As the heavy rare earth element, Dy or Tb is preferable, and Tb is more preferable.

Note that the previously mentioned heavy rare earth element is adhered by any method, such as vapor deposition, sputtering, electrodeposition, spray coating, brush coating, jet dispenser, nozzle, screen printing, squeegee printing, and a sheet method, for example. In order to adhere the heavy rare earth element only to the main surface, a masking may be performed on a surface other than the main surface, as required.

In the present embodiment, a coating containing the heavy rare earth element is produced, and the coating is coated on at least a first main surface of the previously-mentioned sintered body.

There is no particular limitation on a mode of the coating. There is no particular limitation on what is employed as the heavy rare earth element. A heavy rare earth compound containing the heavy rare earth element includes the likes of an alloy, an oxide, a halogenide, a hydroxide, and a hydride, but in particularly a hydride is preferably employed. The hydride of the heavy rare earth element includes $DyH_2$, $TbH_2$, a hydride of Dy—Fe, or a hydride of Tb—Fe. In particular, $DyH_2$ or $TbH_2$ is preferable.

The heavy rare earth compound is preferably particulate. Moreover, average grain size is preferably 100 nm to 50 µm, and is more preferably 1 µm to 10 µm.

A dispersion medium allowing the heavy rare earth element to be dispersed uniformly without dissolving the heavy rare earth element is preferable as a solvent employed in the coating. For example, the solvent may include the likes of an alcohol, an aldehyde, or a ketone, and, of these, ethanol is preferable.

An amount of the heavy rare earth compound in the coating is not particularly limited. For example, the amount may be 10 to 50 mass %. A component other than the heavy rare earth compound may be further contained in the coating, as required. For example, the coating may include the likes of a dispersant for preventing aggregation of heavy rare earth compound particles.

The grain boundary diffusion step of the present embodiment, contrary to a conventional grain boundary diffusion step, is characterized in that a compound including a heavy rare earth element is adhered only to one first main surface or to an opposing first main surface and second main surface, and is not adhered to a first side surface. Adhering the compound including the heavy rare earth element only to one main surface or opposing two main surfaces, not conventional six-surface coating makes it easy for the coercivity distribution of the heavy rare earth element to be configured as the above-mentioned distribution. Furthermore, when attempting to obtain the same kind of magnetic characteristics, the used amount of the compound including the heavy rare earth element can be reduced. Moreover, the heavy rare earth element is preferably adhered uniformly to the whole surface of the main surface.

The following explains how a concentration distribution and a coercivity distribution of the heavy rare earth element change by a method of coating. Note that in the present embodiment, coercivity changes generally according to a concentration change of the heavy rare earth element in the grain boundary. The higher the concentration of the heavy rare earth element is, the higher coercivity becomes.

Figure 6:
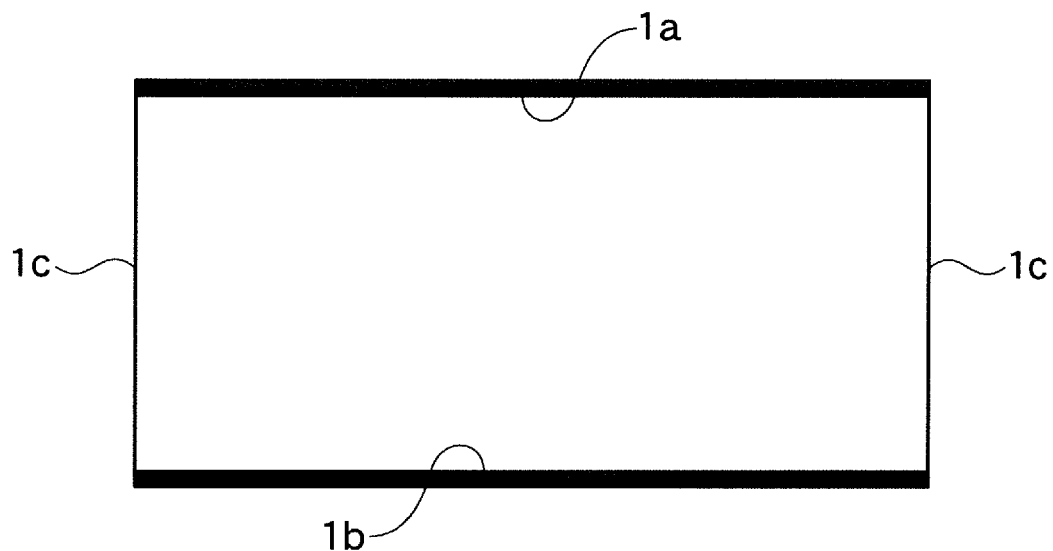
FIG. 6 is a schematic view showing an R-T-B based sintered magnet before performing diffusion processing where a heavy rare earth element has been coated on its two surfaces.

FIG. 6 shows a state before grain boundary diffusion in the case of two-surface coating according to the present embodiment. The heavy rare earth element is coated on the first main surface 1a and the second main surface 1b, and the heavy rare earth element is not coated on the four side surfaces 1c (only two of the side surfaces 1c are shown).

Figure 7:
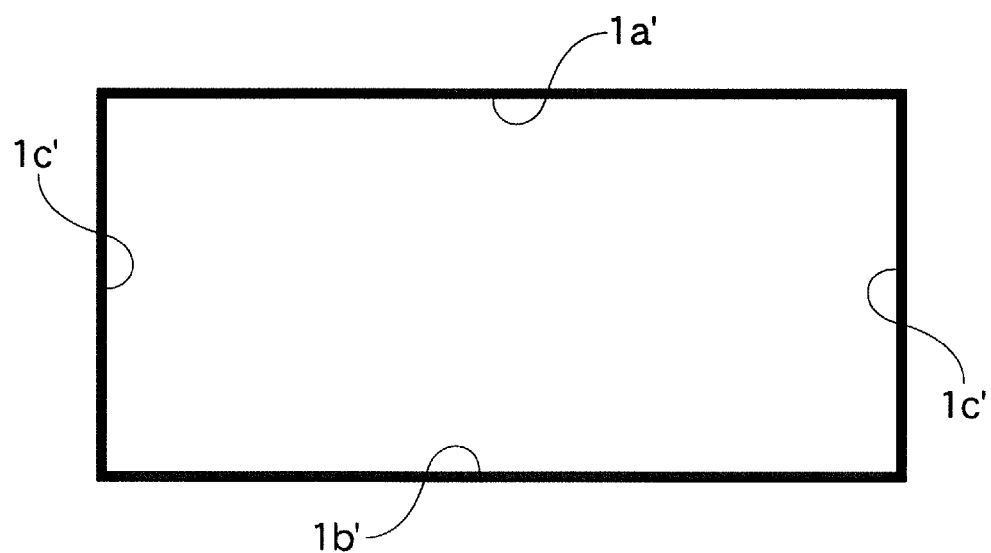
FIG. 7 is a schematic view showing an R-T-B based sintered magnet before performing diffusion processing where a heavy rare earth element has been coated on all its surfaces (six surfaces).

In contrast, FIG. 7 shows a state before grain boundary diffusion in the case of conventional six-surface (all-surface) coating. The heavy rare earth element is coated on all surfaces of the first main surface 1a', the second main surface 1b', and the four side surfaces 1c' (only two of the side surfaces 1c' are shown).

When the case of two-surface coating shown in FIG. 6 and the case of six-surface coating shown in FIG. 7 are compared, the six-surface coating shown in FIG. 7 was conventionally considered to be more preferable than the two-surface coating shown in FIG. 6. In fact, however, the inventors of the present invention have newly discovered that the sintered rare earth magnet 1 showing the coercivity distribution shown in FIG. 3A can be easily obtained at low cost by employing the two-surface coating shown in FIG. 6.

The following explains how excellent the two-surface coating shown in FIG. 6 is more than the six-surface coating shown in FIG. 7.

When the heavy rare earth element is grain boundary diffused, the heavy rare earth element is diffused in accordance with Fick's law. Fick's law, in short, is a law indicating that diffusion flux is proportional to concentration gradient.

In the case of two-surface coating according to the present embodiment, the heavy rare earth element diffuses from two directions of the first main surface 1a and the second main surface 1b toward the inside of the sintered body, in accordance with Fick's law. In contrast, in the case of conventional six-surface (all-surface) coating, the heavy rare earth element diffuses from all coating surfaces toward the inside of the sintered body, in accordance with Fick's law.

Thus, in the case of conventional six-surface (all-surface) coating, in particular, at the corners of the first main surface 1a' and the side surface 1c' and at the corners of the second main surface 1b' and the side surface 1c', diffusion directions cross, and diffusion toward the center of the inside of the sintered body is weakened. Then, the coercivity distribution according to the conventional example as shown in FIG. 3B is considered to be obtained.

In contrast, in the present embodiment, as shown in FIG. 6, a coating amount of the heavy rare earth element that might have been coated on the side surfaces 1c can be added to the first main surface 1a and the second main surface 1b. Furthermore, it is conceivable that due to no diffusion from the side surfaces 1c as well, the heavy rare earth element diffuses to the central part and the coercivity distribution as shown in FIG. 3A is obtained. The above-mentioned hypothesis is a hypothesis where a total coating amount of the heavy rare earth element is made the same between two-surface coating and six-surface coating, but it also means that the used amount of the heavy rare earth element can be reduced in order to obtain the same kind of magnetic characteristics as those of six-surface coating in the case of two-surface coating.

In the R-T-B based sintered magnet 1 according to the present embodiment, the heavy rare earth element does not diffuse from the four side surfaces 1c, hence unevenness in coercivity in each main surface is extremely small.

The coercivity distribution shown in FIG. 3B is one of the conventional R-T-B based sintered magnet obtained by coating the heavy rare earth element for coating on six surfaces while its amount is made the same as in the case of FIG. 3A and diffusing the coated heavy rare earth element under the same temperature conditions and time conditions as in FIG. 3A. As shown in FIG. 3B, in the conventional R-T-B based sintered magnet, portions where the main surfaces (first main surface 1a' and second main surface 1b') and the side surfaces 1c' cross and their vicinities have a relatively high concentration of the heavy rare earth element, and central portions of the main surfaces have a relatively low concentration of the heavy rare earth element, hence unevenness in heavy rare earth element concentration in the main surfaces is large.

In the case of two-surface coating, the heavy rare earth element coating amount (or density) of the first main surface and the heavy rare earth element coating amount (or density) of the second main surface may be changed. When the same amount of the heavy rare earth element is coated on the first main surface and the second main surface, coercivity changes as shown in FIG. 5A mentioned above. In the case of one-surface coating, coercivity changes as shown in FIG. 5C mentioned above. In the case of two-surface coating and changing each coating amount to the two main surfaces, coercivity changes as shown in FIG. 5B mentioned above.

After the coating including the heavy rare earth element has been coated and dried, the heavy rare earth element is diffusion processed to the inside of the sintered body. A method of diffusion processing is not particularly limited, but diffusion processing is usually implemented by heating in a vacuum or an inert gas. Note that the above-mentioned example explains by taking coating as an example, but this is also the case with where the heavy rare earth element is adhered by a method other than coating.

The inventors of the present invention further discovered that, which diffusion of the respective A-type, B-type, and C-type diffusions is predominant depends on diffusion processing temperature and composition and structure of base material. The higher the diffusion processing temperature is, the easier it is for A-type to be predominant. The lower the diffusion processing temperature is, the easier it is for C-type to be predominant. As previously mentioned, it is preferable for C-type to be predominant. Although the lower the diffusion processing temperature is the easier it is for C-type to be predominant, the lower the diffusion processing temperature is the more diffusion speed lowers and the longer a required heating time becomes, and manufacturing efficiency may be decreased.

A preferable diffusion processing temperature according to the present embodiment depends on composition of the R-T-B based sintered magnet as well, but is 750 C to 900° C. By being set to 750° C. or more, diffusion speed is easily raised in a sufficient manner. By being set to 900° C. or less, C-type diffusion is easily predominant.

When each coating amount of the heavy rare earth element is the same, coercivity when grain boundary diffusion is performed at a temperature at which C-type diffusion is predominant tends to become higher compared to that when grain boundary diffusion is performed at a temperature at which A-type diffusion or B-type diffusion is predominant.

[Processing Step (Post-Grain Boundary Diffusion)]

After the diffusion processing step, a processing for removing a residual film remaining on the surface of the main surfaces may be performed, as required. There is no particular limitation on a kind of processing implemented in a processing step after the diffusion processing. For example, shape processing such as a chemical removal method, physical cutting, and grinding, chamfering processing such as barrel polishing, and so on may be performed after the diffusion processing mentioned above.

The R-T-B based sintered magnet obtained by the above steps may undergo surface processing, such as plating, resin coating, oxidation processing, and chemical conversion processing. As a result, corrosion resistance can be further improved.

Furthermore, a magnet obtained by cutting and dividing the R-T-B based sintered magnet according to the present embodiment may be employed.

Specifically, the R-T-B based sintered magnet according to the present embodiment is suitably employed in applications such as a motor, a compressor, a magnetic sensor, and a speaker.

Moreover, the R-T-B based sintered magnet according to the present embodiment may be employed singly, or may be employed by coupling two or more of the R-T-B based sintered magnets as required. The method for coupling is not particularly limited, and includes mechanical coupling, resin mold coupling, and the like for example.

By coupling two or more of the R-T-B based sintered magnets, a large R-T-B based sintered magnet can be easily manufactured. A magnet in which two or more of the R-T-B based sintered magnets are coupled is preferably employed in an application where a particularly large R-T-B based sintered magnet is required, for example, an IPM motor, a wind power generator, a large-sized motor, and so on.

Note that the present invention is not limited to the above-mentioned embodiment, and can be variously changed within the scope thereof.

EXAMPLES

Hereafter, the present invention will be described based on more detailed examples, but the present invention is not limited to these examples.

Experiment Example 1

Sintered Body Prior to Diffusion Processing Step

First, a raw material alloy was prepared by a strip casting method so as to obtain a sintered body satisfying 24 wt % Nd-7 wt % Pr-0.2 wt % Al-2 wt % Co-0.2 wt % Cu-0.15 wt % Zr-0.2 wt % Ga-0.95 wt % B-b al.Fe.

Next, the raw material alloy underwent hydrogen pulverization processing (rough pulverization) where, after having had hydrogen stored in it at room temperature, it underwent dehydrogenization under an Ar gas atmosphere, at 600° C., for one hour.

Next, with respect to the raw material alloy, 0.1 wt % of oleic amide was added as a pulverization aid to the roughly pulverized powder prior to a post-hydrogen pulverization fine pulverization being performed, and mixing was performed using a Nauta Mixer. Subsequently, fine pulverization was performed employing a jet mill using $N_2$ gas, and a finely pulverized powder having an average grain size of about 4.0 μm was configured.

The obtained finely pulverized powder was filled inside a mold disposed in an electromagnet, in-magnetic field pressing that applied a pressure of 50 MPa while applying a magnetic field of 1200 kA/m was performed, and a green compact was obtained.

The obtained green compact was sintered at 1060° C. for 12 hours, and a sintered body was obtained. Subsequently, the sintered body was surface polished, cut, cleaned, and dried, whereby a sintered body of size 20.2×20.2×6.2 mm was finally obtained.

Note that residual magnetic flux density of the sintered body overall was 1390 mT, and coercivity of the sintered body overall was 1281 kA/m.

Diffusion Processing Step

The obtained sintered body underwent a pre-processing of the diffusion processing step by undergoing two times a processing in which it was immersed for three minutes in a mixed solution of nitric acid and ethanol and then immersed for one minute in ethanol. After the pre-processing, the sintered body was cleaned and dried.

In addition, a Tb-containing coating for coating on the sintered body was produced. A $TbH_2$ raw material was finely pulverized employing a jet mill using N2 gas, whereby a $TbH_2$ fine powder was produced. Next, the $TbH_2$ fine powder was mixed in an alcohol solution and dispersed in the alcohol solution to be converted to a coating, and the Tb-containing coating was obtained.

In Examples 1 and 2, the two main surfaces (surfaces of 20.2×20.2 mm) of the sintered body were coated with the Tb-containing coating by brush coating. Coating was performed such that an adhering density of Tb at this time was 23.4 mg/cm$^2$. A Tb adhering amount to the base material overall at this time was 1.0 wt % with respect to base material mass 100 wt %.

In Comparative Examples 1 and 2, all of the two main surfaces (surfaces of 20.2×20.2 mm) and the four side surfaces (surfaces of 20.2×6.2 mm) of the sintered body were coated with the Tb-containing coating by brush coating. Coating was performed such that an adhering density of Tb at this time was 14.5 mg/cm$^2$. A Tb adhering amount to the base material overall at this time was the same as for Experiment Examples 1 and 2 (1.0 wt %).

The sintered body after having been coated with the Tb-containing coating underwent aging processing at 500° C., after having undergone diffusion processing at the temperature and for the time described in Table 1 below.

After Diffusion Processing Step

All six surfaces of the sintered body after the diffusion processing step had cutting and polishing of 0.1 mm implemented thereon. As a result, size of the sintered body became 20.0×20.0×6.0 mm. The sintered body after polishing underwent cleaning and drying, and a sample (magnet) described in Table 1 was obtained.

Hereafter, methods for evaluating each characteristic will be described.

Residual Magnetic Flux Density and Coercivity of Magnet Overall

Residual magnetic flux density Br and coercivity Hcj of the magnet overall were measured by a BH tracer. At that time, the obtained sample was quartered to be made into four samples of 10 mm×10 mm×6 mm, and measurement was performed after overlapping two of those so as to have 10 mm×10 mm×12 mm.

Partial Coercivity

A region including a portion whose partial coercivity was to be measured was cut out in a size of 1 mm×5 mm×1 mm, and coercivity of the cut-out partial coercivity measurement sample was measured by a pulse BH tracer.

Figure 9:
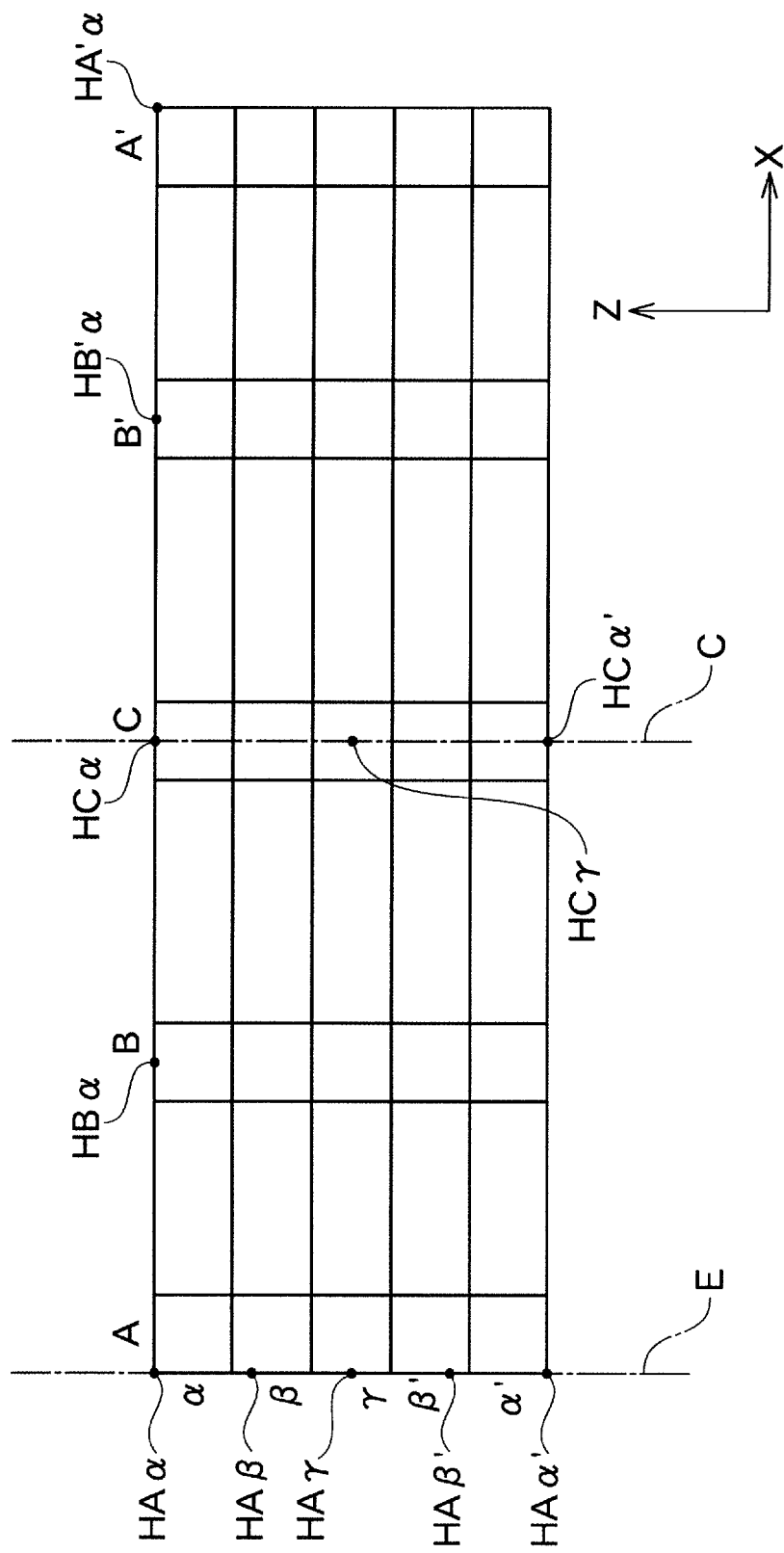
FIG. 9 is a schematic view showing measurement places of coercivity in each embodiment and comparative example.

Specifically, 25 partial coercivity measurement samples including a cross section shown in FIG. 2A and at a position shown in FIG. 9 were cut out.

In the x-axis direction, a midpoint between point HAα and point HA'α was assumed to be point HCα, a midpoint between point HAα and point HCα was assumed to be point HBα, and a midpoint between point HA'α and point HCα was assumed to be point HB'α. Then, portions including each point were respectively set, and regions including each portion were cut out, whereby the partial coercivity measurement samples were configured.

In the z-axis direction, a midpoint between point HAα and point HAα' was assumed to be point HAγ, a midpoint between point HAα and point HAγ was assumed to be point HAβ, and a midpoint between point Haα' and point HAγ was assumed to be point HAβ'. Then, portions including each point were respectively set, and regions including each portion were cut out, whereby the partial coercivity measurement samples were configured. Note that there occurs between each region a cutting margin of 0.2 to 0.3 mm not shown in FIG. 9, hence if a sample of thickness 6.0 mm is divided into five in a thickness direction (z-axis direction), exactly five partial coercivity measurement samples of thickness 1 mm are obtained.

Moreover, in the present embodiment, $\Delta Hcj_M$, $\Delta Hcj_C$, $\Delta Hcj_E$, and $\Delta Hcj_G$ were calculated from the partial coercivities of the portions at the 25 places shown in FIG. 9.

Heat Demagnetization (%)=100×(Flux(Measurement Temperature)−Flux(Room Temperature))/Flux (Room Temperature)

According to Table 1, Examples 1 and 2, which have undergone two-surface coating and diffusion processing, satisfy $\Delta Hcj_M \leq 60$ kA/m and $\Delta Hcj_G \leq 60$ kA/m. In contrast, Comparative Examples 1 and 2, which have undergone six-surface coating, do not satisfy $\Delta Hcj_M \leq 60$ kA/m or $\Delta Hcj_G \leq 60$ kA/m.

Figure 10:
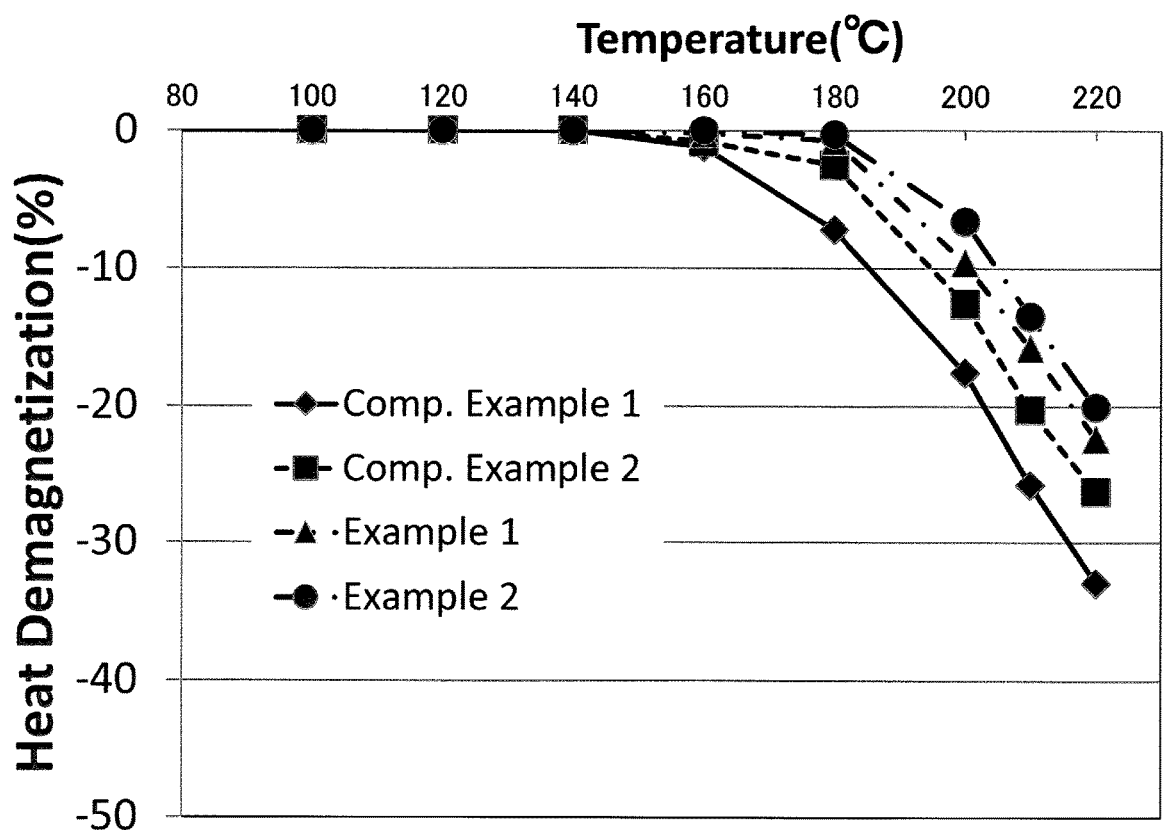
FIG. 10 is a graph showing heat demagnetization in each example and comparative example.

According to FIG. 10, Examples 1 and 2, which have undergone two-surface coating, have a smaller heat demagnetization rate and more excellent heat demagnetization characteristics, compared with Comparative Examples 1 and 2, which have undergone six-surface coating. Furthermore, Examples 1 and 2 obtain more excellent Br and Hcj by a used amount of Tb equivalent to that of Comparative Examples 1 and 2. That is, in Examples 1 and 2, the heavy rare earth element is more efficiently diffused due to two-

TABLE 1

| | Diffusion Conditions | | | | Characteristics After Diffusion Processing | | | | | | | |
|---|---|---|---|---|---|---|---|---|---|---|---|---|
| | Number of Tb Coated Surfaces | Tb Adhering Density mg/cm2 | Diffusion Temperature °C. | Diffusion Time h | Residual Magnetic Flux Density mT | Coercivity (Magnet Overall) kA/m | Place | Partial Coercivity kA/m | | | | |
| | | | | | | | | A | B | C | B' | A' |
| Comp. Example 1 | 6 | 14.5 | 950 | 10 | 1377 | 1823 | α | 1977 | 1856 | 1849 | 1861 | 1981 |
| | | | | | | | β | 1941 | 1729 | 1729 | 1731 | 1944 |
| | | | | | | | γ | 1876 | 1665 | 1660 | 1670 | 1879 |
| | | | | | | | β' | 1942 | 1729 | 1725 | 1727 | 1945 |
| | | | | | | | α' | 1979 | 1861 | 1846 | 1859 | 1981 |
| Comp. Example 2 | 6 | 14.5 | 850 | 15 | 1380 | 1841 | α | 1945 | 1847 | 1839 | 1850 | 1950 |
| | | | | | | | β | 1915 | 1791 | 1789 | 1790 | 1920 |
| | | | | | | | γ | 1855 | 1721 | 1711 | 1725 | 1859 |
| | | | | | | | β' | 1919 | 1785 | 1787 | 1790 | 1918 |
| | | | | | | | α' | 1952 | 1851 | 1835 | 1850 | 1948 |
| Example 1 | 2 | 23.4 | 950 | 10 | 1381 | 1889 | α | 1937 | 1946 | 1956 | 1948 | 1936 |
| | | | | | | | β | 1889 | 1900 | 1912 | 1898 | 1885 |
| | | | | | | | γ | 1861 | 1874 | 1885 | 1871 | 1862 |
| | | | | | | | β' | 1895 | 1905 | 1918 | 1904 | 1889 |
| | | | | | | | α' | 1945 | 1951 | 1962 | 1948 | 1935 |
| Example 2 | 2 | 23.4 | 850 | 15 | 1383 | 1903 | α | 1927 | 1936 | 1938 | 1934 | 1922 |
| | | | | | | | β | 1907 | 1916 | 1919 | 1914 | 1903 |
| | | | | | | | γ | 1869 | 1880 | 1885 | 1879 | 1870 |
| | | | | | | | β' | 1907 | 1916 | 1919 | 1914 | 1902 |
| | | | | | | | α' | 1926 | 1935 | 1940 | 1934 | 1923 |

TABLE 2

| | Unevenness in Coercivity (kA/m) | | | | |
|---|---|---|---|---|---|
| | $\Delta Hcj_M$ | $\Delta Hcj_G$ | $\Delta Hcj_C$ | $\Delta Hcj_E$ | $|\Delta Hcj_C - \Delta Hcj_E|$ |
| Comp. Example 1 | 132 | 219 | 189 | 103 | 86 |
| Comp. Example 2 | 111 | 148 | 128 | 97 | 31 |
| Example 1 | 20 | 24 | 77 | 84 | 7 |
| Example 2 | 17 | 16 | 55 | 58 | 3 |

Heat Demagnetization

Flux at room temperature of each sample was measured, furthermore, Flux at each temperature by which heat demagnetization is measured was measured. Then, heat demagnetization was found by calculation based on the following formula. Note that Flux was found by a repeated extracting method by a search coil (number of turns 200) using a digital fluxmeter (TDF-5 manufactured by Toei Industry Co., Ltd.). FIG. 10 shows change in heat demagnetization of Examples 1 and 2 and Comparative Examples 1 and 2.

surface coating, and preferable magnetic characteristics are consequently obtained. In other words, Examples 1 and 2 have substantively succeeded in reduction of the used amount of Tb.

Comparing Example 1 and Example 2 shows that Example 2, where heating was performed at 850° C. for 15 hours, has more excellent heat demagnetization characteristics and smaller unevenness in partial coercivity, that is, smaller $\Delta Hcj_M$, $\Delta Hcj_C$, $\Delta Hcj_E$, and $\Delta Hcj_G$ than those in Example 1, where heating was performed at 950° C. for 10 hours in the diffusion processing step.

Experiment Example 2

Examples 3 to 6 and Comparative Examples 3 to 6 were obtained similarly to Example 1 except for changing Tb adhering density of Example 1 to values shown in Tables 3 and 4. Results are shown in Table 3 to Table 5.

TABLE 3

| | Diffusion Conditions | | | | Characteristics After Diffusion Processing | | | | | | |
|---|---|---|---|---|---|---|---|---|---|---|---|
| | Number of Tb Coated Surfaces | Tb Adhering Density mg/cm2 | Diffusion Temperature ° C. | Diffusion Time h | Residual Magnetic Flux Density mT | Coercivity (Magnet Overall) kA/m | Partial Coercivity kA/m | | | | |
| | | | | | | | Place | A | B | C | B' | A' |
| Comp. Example 3 | 6 | 10.9 | 950 | 10 | 1379 | 1802 | α | 1953 | 1832 | 1825 | 1832 | 1955 |
| | | | | | | | β | 1917 | 1706 | 1705 | 1704 | 1919 |
| | | | | | | | γ | 1853 | 1642 | 1632 | 1643 | 1855 |
| | | | | | | | β' | 1920 | 1709 | 1707 | 1708 | 1918 |
| | | | | | | | α' | 1955 | 1835 | 1824 | 1830 | 1953 |
| Comp. Example 4 | 6 | 10.9 | 850 | 15 | 1382 | 1816 | α | 1928 | 1816 | 1808 | 1820 | 1926 |
| | | | | | | | β | 1894 | 1759 | 1758 | 1762 | 1894 |
| | | | | | | | γ | 1831 | 1690 | 1683 | 1689 | 1829 |
| | | | | | | | β' | 1895 | 1763 | 1756 | 1764 | 1893 |
| | | | | | | | α' | 1927 | 1820 | 1811 | 1817 | 1927 |
| Example 3 | 2 | 17.6 | 950 | 10 | 1382 | 1872 | α | 1902 | 1918 | 1925 | 1918 | 1906 |
| | | | | | | | β | 1857 | 1875 | 1882 | 1873 | 1855 |
| | | | | | | | γ | 1821 | 1844 | 1855 | 1841 | 1824 |
| | | | | | | | β' | 1855 | 1877 | 1880 | 1875 | 1856 |
| | | | | | | | α' | 1900 | 1918 | 1926 | 1917 | 1903 |
| Example 4 | 2 | 17.6 | 850 | 15 | 1385 | 1882 | α | 1895 | 1908 | 1915 | 1910 | 1896 |
| | | | | | | | β | 1876 | 1886 | 1896 | 1886 | 1876 |
| | | | | | | | γ | 1832 | 1848 | 1854 | 1847 | 1833 |
| | | | | | | | β' | 1870 | 1881 | 1892 | 1885 | 1876 |
| | | | | | | | α' | 1890 | 1909 | 1912 | 1906 | 1895 |

TABLE 4

| | Diffusion Conditions | | | | Characteristics After Diffusion Processing | | | | | | |
|---|---|---|---|---|---|---|---|---|---|---|---|
| | Number of Tb Coated Surfaces | Tb Adhering Density mg/cm2 | Diffusion Temperature ° C. | Diffusion Time h | Residual Magnetic Flux Density mT | Coercivity (Magnet Overall) kA/m | Partial Coercivity kA/m | | | | |
| | | | | | | | Place | A | B | C | B' | A' |
| Comp. Example 5 | 6 | 7.3 | 950 | 10 | 1381 | 1743 | α | 1889 | 1770 | 1763 | 1766 | 1885 |
| | | | | | | | β | 1857 | 1642 | 1641 | 1645 | 1854 |
| | | | | | | | γ | 1796 | 1564 | 1561 | 1567 | 1792 |
| | | | | | | | β' | 1858 | 1641 | 1635 | 1650 | 1857 |
| | | | | | | | α' | 1890 | 1772 | 1766 | 1771 | 1889 |
| Comp. Example 6 | 6 | 7.3 | 850 | 15 | 1384 | 1767 | α | 1867 | 1767 | 1765 | 1770 | 1870 |
| | | | | | | | β | 1842 | 1712 | 1710 | 1711 | 1840 |
| | | | | | | | γ | 1786 | 1633 | 1625 | 1636 | 1781 |
| | | | | | | | β' | 1842 | 1715 | 1712 | 1709 | 1841 |
| | | | | | | | α' | 1869 | 1771 | 1767 | 1772 | 1870 |
| Example 5 | 2 | 11.7 | 950 | 10 | 1383 | 1798 | α | 1837 | 1852 | 1860 | 1850 | 1834 |
| | | | | | | | β | 1785 | 1804 | 1816 | 1801 | 1781 |
| | | | | | | | γ | 1738 | 1772 | 1791 | 1768 | 1738 |
| | | | | | | | β' | 1778 | 1802 | 1813 | 1801 | 1779 |
| | | | | | | | α' | 1833 | 1846 | 1858 | 1847 | 1834 |
| Example 6 | 2 | 11.7 | 850 | 15 | 1386 | 1814 | α | 1837 | 1847 | 1854 | 1844 | 1832 |
| | | | | | | | β | 1818 | 1827 | 1835 | 1824 | 1813 |
| | | | | | | | γ | 1765 | 1788 | 1798 | 1787 | 1767 |
| | | | | | | | β' | 1821 | 1830 | 1840 | 1829 | 1814 |
| | | | | | | | α' | 1841 | 1850 | 1860 | 1849 | 1838 |

TABLE 5

| | Unevenness in Coercivity (kA/m) | | | | |
|---|---|---|---|---|---|
| | $\Delta Hcj_M$ | $\Delta Hcj_G$ | $\Delta Hcj_C$ | $\Delta Hcj_E$ | $|\Delta Hcj_C - \Delta Hcj_E|$ |
| Comp. Example 3 | 130 | 223 | 193 | 102 | 91 |
| Comp. Example 4 | 120 | 148 | 128 | 97 | 31 |
| Example 3 | 23 | 34 | 71 | 81 | 10 |
| Example 4 | 20 | 22 | 61 | 63 | 2 |
| Comp. Example 5 | 126 | 235 | 205 | 94 | 111 |
| Comp. Example 6 | 104 | 161 | 142 | 83 | 59 |
| Example 5 | 26 | 53 | 70 | 99 | 29 |
| Example 6 | 21 | 32 | 63 | 75 | 12 |

According to Table 3 to Table 5, Examples 3 to 6, which have undergone two-surface coating, satisfy $\Delta Hcj_M \leq 60$ kA/m and $\Delta Hcj_G \leq 60$ kA/m. In contrast, Comparative Examples 3 to 6, which have undergone six-surface coating, do not satisfy $\Delta Hcj_M \leq 60$ kA/m or $\Delta Hcj_G \leq 60$ kA/m.

Figure 11:
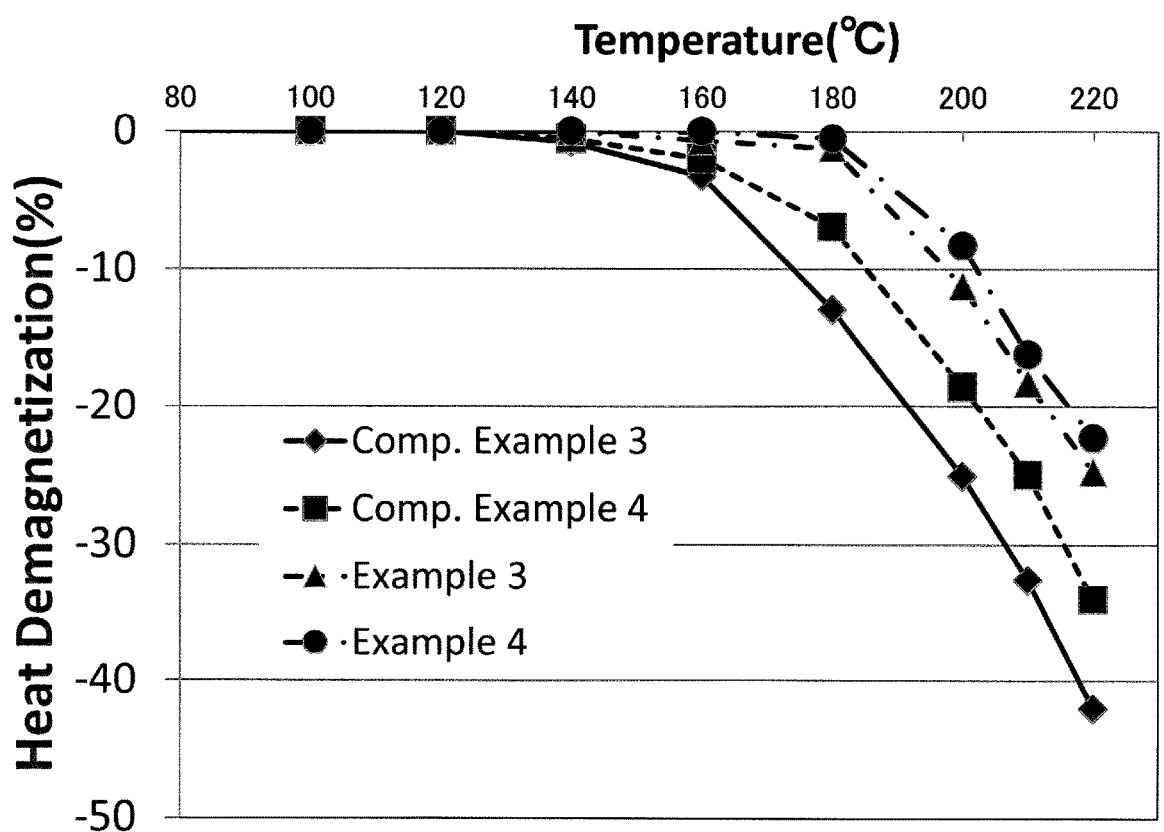
FIG. 11 is a graph showing heat demagnetization in each example and comparative example.
Figure 12:
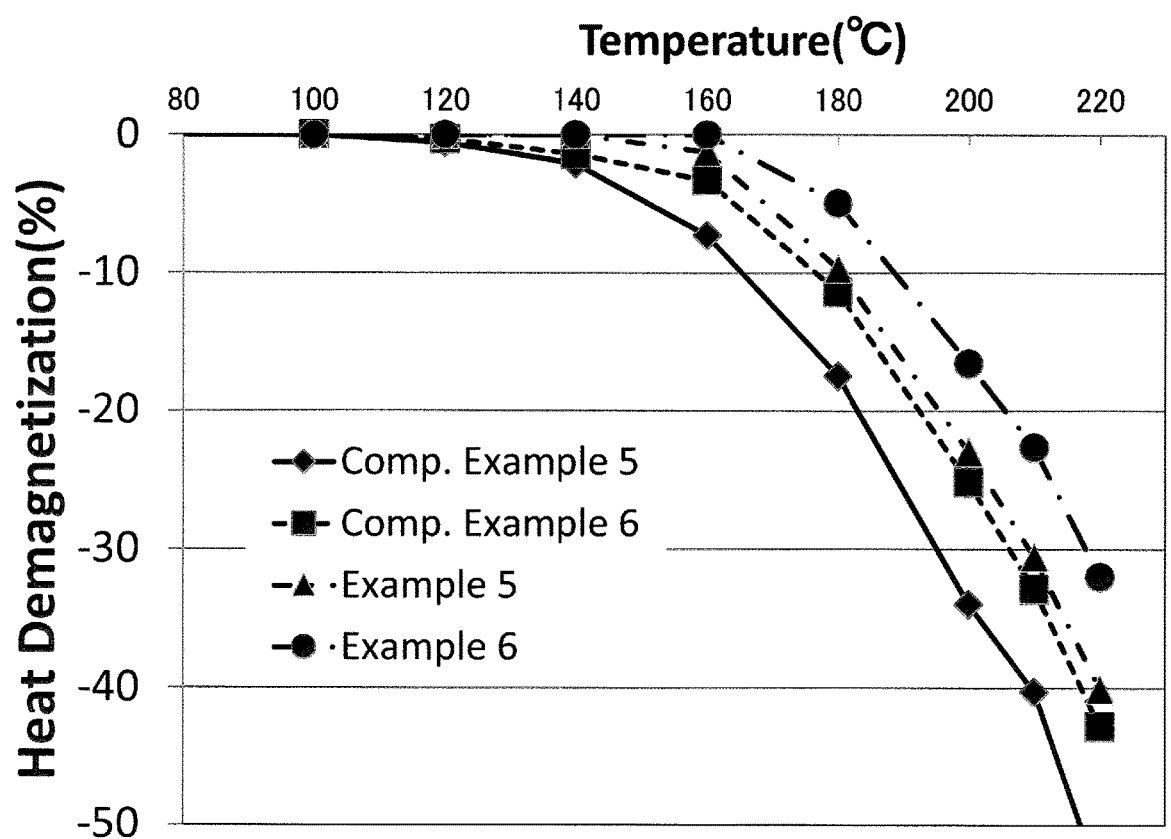
FIG. 12 is a graph showing heat demagnetization in each example and comparative example.

According to FIG. 11 and FIG. 12, Examples 3 to 6, which have undergone two-surface coating, have a smaller heat demagnetization rate and more excellent heat demagnetization characteristics than those of comparative Examples 3 to 6, which have undergone six-surface coating. Furthermore, Examples 3 to 6 obtain more excellent Br and Hcj by a used amount of Tb equivalent to that of Comparative Examples 3 to 6. That is, in Examples 3 to 6, the heavy rare earth element is more efficiently diffused due to two-surface coating, and preferable magnetic characteristics are consequently obtained. In other words, Examples 3 to 6 have substantively succeeded in reduction of the used amount of Tb.

Comparing Example 3 and Example 4 shows that Example 4, where heating was performed at low temperature for a long time in the diffusion processing step, has more excellent heat demagnetization characteristics and smaller $\Delta Hcj_C$ and $\Delta Hcj_E$ than those of Example 3, where heating was performed at high temperature for a short time in the diffusion processing step. Moreover, comparing Example 5 and Example 6 shows that Example 6, where heating was performed at low temperature for a long time in the diffusion processing step, has more excellent heat demagnetization characteristics and smaller $\Delta Hcj_C$ and $\Delta Hcj_E$ than those of Example 5, where heating was performed at high temperature for a short time in the diffusion processing step.

Experiment Example 4

Examples 11 and 12 and Comparative Examples 11 and 12 were obtained similarly to Example 1 except for replacing TbH$_2$ of Example 1 with DyH$_2$. Results are shown in Table 6 and Table 7.

TABLE 7

| | Unevenness in Coercivity (kA/m) | | | | |
|---|---|---|---|---|---|
| | $\Delta Hcj_M$ | $\Delta Hcj_G$ | $\Delta Hcj_C$ | $\Delta Hcj_E$ | $|\Delta Hcj_C - \Delta Hcj_E|$ |
| Comp. Example 11 | 132 | 218 | 188 | 103 | 85 |
| Comp. Example 12 | 107 | 144 | 123 | 90 | 33 |
| Example 11 | 27 | 21 | 84 | 78 | 6 |
| Example 12 | 23 | 17 | 65 | 61 | 4 |

According to Table 6 and Table 7, Examples 11 and 12, which have undergone two-surface coating, satisfy $\Delta Hcj_M \leq 60$ kA/m. In contrast, Comparative Examples 11 and 12 that have undergone six-surface coating do not satisfy $\Delta Hcj_M \leq 60$ kA/m.

Figure 13:
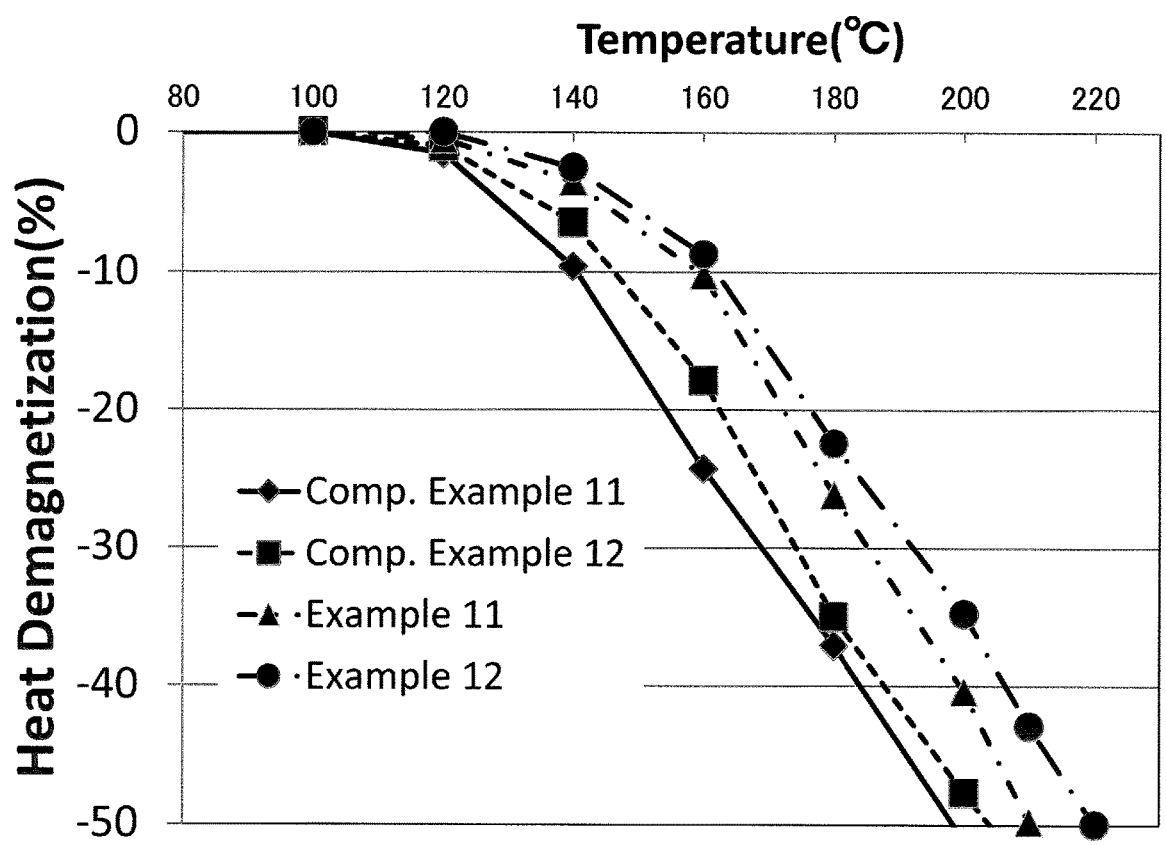
FIG. 13 is a graph showing heat demagnetization in each example and comparative example.

According to FIG. 13, Examples 11 and 12, which have undergone two-surface coating, have a smaller heat demagnetization rate and more excellent heat demagnetization characteristics than those of Comparative Examples 11 and 12, which have undergone six-surface coating. Furthermore, Examples 11 and 12 obtain more excellent Br and Hcj by a used amount of Dy equivalent to that of Comparative Examples 11 and 12. That is, in Examples 11 and 12, the heavy rare earth element is more efficiently diffused due to two-surface coating, and preferable magnetic characteristics are consequently obtained. In other words, Examples 11 and 12 have substantively succeeded in reduction of the used amount of Dy.

Comparing Example 11 and Example 12 shows that Example 12, where heating was performed at low temperature for a long time in the diffusion processing step, has more excellent heat demagnetization characteristics and a smaller unevenness in partial coercivity that those of Example 11, where heating was performed at high temperature for a short time in the diffusion processing step.

Note that comparing Examples 1 and 2 using Tb and Examples 11 and 12 using Dy shows that Examples 1 and 2

TABLE 6

| | Diffusion Conditions | | | | Characteristics After Diffusion Processing | | | | | | |
|---|---|---|---|---|---|---|---|---|---|---|---|
| | Number of Dy Coated Surfaces | Tb Adhering Density | Diffusion Temperature | Diffusion Time | Residual Magnetic Flux Density | Coercivity (Magnet Overall) | Partial Coercivity kA/m | | | | |
| | | mg/cm2 | ° C. | h | mT | kA/m | Place | A | B | C | B' | A' |
| Comp. Example 11 | 6 | 14.5 | 950 | 10 | 1374 | 1620 | α | 1767 | 1646 | 1639 | 1650 | 1770 |
| | | | | | | | β | 1731 | 1519 | 1519 | 1521 | 1734 |
| | | | | | | | γ | 1665 | 1456 | 1451 | 1461 | 1669 |
| | | | | | | | β' | 1733 | 1519 | 1515 | 1517 | 1735 |
| | | | | | | | α' | 1769 | 1652 | 1637 | 1648 | 1771 |
| Comp. Example 12 | 6 | 14.5 | 850 | 15 | 1378 | 1626 | α | 1736 | 1637 | 1629 | 1641 | 1735 |
| | | | | | | | β | 1706 | 1580 | 1579 | 1579 | 1710 |
| | | | | | | | γ | 1646 | 1511 | 1506 | 1515 | 1650 |
| | | | | | | | β' | 1709 | 1575 | 1578 | 1579 | 1709 |
| | | | | | | | α' | 1731 | 1641 | 1626 | 1641 | 1732 |
| Example 11 | 2 | 23.4 | 950 | 10 | 1379 | 1693 | α | 1723 | 1735 | 1747 | 1733 | 1720 |
| | | | | | | | β | 1679 | 1691 | 1696 | 1688 | 1675 |
| | | | | | | | γ | 1652 | 1663 | 1668 | 1662 | 1647 |
| | | | | | | | β' | 1685 | 1697 | 1701 | 1694 | 1681 |
| | | | | | | | α' | 1730 | 1740 | 1752 | 1738 | 1725 |
| Example 12 | 2 | 23.4 | 850 | 15 | 1380 | 1710 | α | 1718 | 1726 | 1735 | 1722 | 1712 |
| | | | | | | | β | 1697 | 1704 | 1715 | 1702 | 1693 |
| | | | | | | | γ | 1656 | 1666 | 1670 | 1664 | 1653 |
| | | | | | | | β' | 1696 | 1706 | 1715 | 1703 | 1693 |
| | | | | | | | α' | 1716 | 1724 | 1735 | 1724 | 1713 |

DESCRIPTION OF THE NUMERALS

1 ... R-T-B based sintered magnet
1' ... conventional R-T-B based sintered magnet
1a, 1a' ... first main surface
1b, 1b' ... second main surface
1c, 1c' ... side surface
11 ... coercivity measurement sample
21 ... grain boundary
23 ... crystal grain

The invention claimed is:

1. An R-T-B based sintered magnet comprising a first main surface and a first side surface, wherein
the first main surface has a coercivity that is higher than that of the first side surface,
$\Delta Hcj_M \leq 60$ kA/m is satisfied, where $\Delta Hcj_M$ is a difference in coercivity between a portion having a highest coercivity on the first main surface and a portion having a lowest coercivity on the first main surface,
$\Delta Hcj_G \leq 60$ kA/m is satisfied, where $\Delta Hcj_G$ is a difference in coercivity between a portion having a highest coercivity on a first cross section and a portion having a lowest coercivity on the first cross section,
the first cross section is a cross section parallel to the first main surface and spaced from the first main surface at a predetermined length or more,
a coercivity decreases monotonically from the first main surface to a point $HC_{min}$, and the coercivity increases monotonically from the point $HC_{min}$ to a second main surface, where
the point $HC_{min}$ is a point having a lowest coercivity on a straight line that passes through a central part of the first main surface and is perpendicular to the first main surface and
the second main surface is opposite to the first main surface.

2. The R-T-B based sintered magnet as set forth in claim 1, wherein
$|\Delta Hcj_c - \Delta Hcj_E| \leq 20$ kA/m is satisfied, where
$\Delta Hcj_c$ is a difference in coercivity between a portion having a highest coercivity and a portion having a lowest coercivity on a straight line that passes through a central part of the first main surface and is perpendicular to the first main surface and
$\Delta Hcj_E$ is a difference in coercivity between a portion having a highest coercivity on the first side surface and a portion having a lowest coercivity on the first side surface.

3. The R-T-B based sintered magnet as set forth in claim 1, wherein
$\Delta Hcj_E > \Delta Hcj_M$ is satisfied, where $\Delta Hcj_E$ is a difference in coercivity between a portion having a highest coercivity on the first side surface and a portion having a lowest coercivity on the first side surface.

4. The R-T-B based sintered magnet as set forth in claim 1, wherein
a thickness in a perpendicular direction to the first main surface is 1.5 to 9 mm.

5. The R-T-B based sintered magnet as set forth in claim 1, wherein
a coercivity decreases monotonically from the first main surface to a second main surface along a straight line that passes through a central part of the first main surface and is perpendicular to the first main surface, where the second main surface is opposite to the first main surface.

6. An R-T-B based sintered magnet comprising two or more of the R-T-B based sintered magnets as set forth in claim 1 coupled to each other.

7. A motor including the R-T-B based sintered magnet as set forth in claim 1.

8. The R-T-B based sintered magnet as set forth in claim 1, wherein
the R-T-B based sintered magnet is formed in a generally rectangular parallelepiped shape by the first main surface and a second main surface that are parallel to a XY plane, and the first side surface and three additional side surfaces perpendicular to the XY plane, and a heavy rare earth element has been coated only on one or both main surfaces in a grain diffusion step of a sintered body in a process of forming the magnet.

9. The R-T-B based sintered magnet as set forth in claim 1, wherein
5 kA/m $\leq \Delta Hcj_c \leq 80$ kA/m is satisfied, where $\Delta Hcj_c$ is a difference in coercivity between a portion having a highest coercivity and a portion having a lowest coercivity on a straight line that passes through a central part of the first main surface and is perpendicular to the first main surface.

10. The R-T-B based sintered magnet as set forth in claim 9, wherein
$|\Delta Hcj_c - \Delta Hcj_E| \leq 20$ kA/m is satisfied, where $\Delta Hcj_E$ is a difference in coercivity between a portion having a highest coercivity on the first side surface and a portion having a lowest coercivity on the first side surface.

11. The R-T-B based sintered magnet as set forth in claim 9, wherein
$\Delta Hcj_E > \Delta Hcj_M$ is satisfied, where $\Delta Hcj_E$ is a difference in coercivity between a portion having a highest coercivity on the first side surface and a portion having a lowest coercivity on the first side surface.

12. The R-T-B based sintered magnet as set forth in claim 9, wherein
a thickness in a perpendicular direction to the first main surface is 1.5 to 9 mm.

13. The R-T-B based sintered magnet as set forth in claim 9, wherein
a coercivity decreases monotonically from the first main surface to a second main surface along a straight line that passes through a central part of the first main surface and is perpendicular to the first main surface, where the second main surface is opposite to the first main surface.

14. An R-T-B based sintered magnet comprising two or more of the R-T-B based sintered magnets as set forth in claim 9 coupled to each other.

15. A motor including the R-T-B based sintered magnet as set forth in claim 9.

* * * * *